US012784958B2

(12) United States Patent
Bowman

(10) Patent No.: US 12,784,958 B2
(45) Date of Patent: Nov. 3, 2026

(54) INDUCTOR COIL

(71) Applicant: ETA GREEN POWER LTD., Hethel (GB)

(72) Inventor: Liam Bowman, Old Catton (GB)

(73) Assignee: ETA GREEN POWER LTD., Hethil (GB)

( * ) Notice: Subject to any disclaimer, the term of this patent is extended or adjusted under 35 U.S.C. 154(b) by 784 days.

(21) Appl. No.: 18/033,703

(22) PCT Filed: Oct. 27, 2021

(86) PCT No.: PCT/EP2021/079755

§ 371 (c)(1),
(2) Date: Apr. 25, 2023

(87) PCT Pub. No.: WO2022/090278

PCT Pub. Date: May 5, 2022

(65) Prior Publication Data

US 2023/0395299 A1 Dec. 7, 2023

(30) Foreign Application Priority Data

Oct. 28, 2020 (EP) .................................... 20204340

(51) Int. Cl.
*H01F 27/28* (2006.01)
*H01F 27/22* (2006.01)
*H01F 27/26* (2006.01)

(52) U.S. Cl.
CPC ........... *H01F 27/22* (2013.01); *H01F 27/263* (2013.01)

(58) Field of Classification Search
CPC .......... H01F 27/22; H01F 27/263; H01F 3/14; H01F 2027/348; H01F 27/266

(Continued)

(56) References Cited

U.S. PATENT DOCUMENTS

2013/0300528 A1 11/2013 Nobusaka et al.
2014/0300440 A1* 10/2014 Koenig ................ H01F 41/066 29/605

(Continued)

FOREIGN PATENT DOCUMENTS

JP 2011181856 A 9/2011
JP 2014078665 A 5/2014

(Continued)

OTHER PUBLICATIONS

PCT International Search Report and Written Opinion, PCT/EP2021/079755, Feb. 16, 2022, 17 pages.

(Continued)

*Primary Examiner* — Shawki S Ismail
*Assistant Examiner* — Kazi S Hossain
(74) *Attorney, Agent, or Firm* — QUARLES & BRADY LLP

(57) ABSTRACT

The present invention relates to an inductor coil, comprising: a first component (12); a second component (14); a length of conductor (18); a heat sink (100); wherein, the first component is located adjacent to the second component; wherein, a core (16) is formed from the first component and the second component; wherein, a first part of the length of conductor is wound around at least the core to form a plurality of turns of conductor; wherein, the heat sink comprises a thermally conductive material; wherein, the heat sink comprises a first part (90, 110) and a second part; wherein, first part of the heat sink has a first material and/or structural characteristic and the second part of the heat sink has a second material and/or structural characteristic different to the first material and/or structural characteristic; and wherein, an inner surface of the first part of the heat sink is in contact with an outer surface of a part of the plurality of turns of conductor.

23 Claims, 12 Drawing Sheets

(58) Field of Classification Search
USPC ........................................ 336/61, 55–60, 221
See application file for complete search history.

(56) References Cited

U.S. PATENT DOCUMENTS

| | | | | |
|---|---|---|---|---|
| 2014/0327505 | A1 | 11/2014 | Schekulin et al. | |
| 2019/0035543 | A1* | 1/2019 | Suzuki .................... | H01F 27/40 |
| 2020/0194160 | A1* | 6/2020 | Tsuchida ................. | H01F 27/22 |

FOREIGN PATENT DOCUMENTS

| | | | | | |
|---|---|---|---|---|---|
| JP | 2015207741 | A | | 11/2015 | |
| JP | 2019046983 | A | * | 3/2019 | ............. H01F 27/22 |
| WO | 2019044835 | A1 | | 3/2019 | |

OTHER PUBLICATIONS

Japan Patent Office, Decision of Refusal dated Nov. 26, 2024 for corresponding JP Patent App. No. 2023-526149 [14 pgs.].
Korean Patent Office, Notice of Preliminary Rejection dated Oct. 16, 2024 for corresponding Korean Patent App. No. 10-2023-7018108 [33 pgs].

* cited by examiner

INDUCTOR COIL

CROSS REFERENCE TO RELATED APPLICATIONS

This application represents the United States national stage entry of PCT International Application PCT/EP2021/079755, filed Oct. 27, 2021, and published under Publication No. WO/2022/090278 on May 5, 2022, which claims benefit of European Application 20204340.2 filed Oct. 28, 2020, both of which are incorporated herein in their entirety by reference for all purposes.

FIELD OF THE INVENTION

The present invention relates to inductor coils and methods of cooling inductor coils.

BACKGROUND OF THE INVENTION

Inductor coils can generate heat, and in certain situations this heat needs to be extracted in order to cool the inductor coil.

Current solutions rely on a mechanical housing that encapsulates the entire inductor using some form of epoxy compound. This is beneficial over using natural convection because the thermal conductivity of air is approx. 24 mW/m·k. whereas cost effective epoxies that are applicable for potting inductors range at 1 W/m·k-1.3 W/m·k which is effectively over 50 times better with regards to thermal performance. This has obvious benefits at first sight but it also has some significant disadvantages that are not necessarily taken into consideration when looking at the process as a whole. Ferrite materials saturate more readily at the higher temperatures from 25° C. to 100° C., and a 10% reduction in saturation levels is observed even with high grade materials such as 3C96. Complete encapsulation also provides a better path for the ferrite material, and consequently maximum saturation current levels are reduced. Materials in both the potting compound and the mechanical housing, to fully encapsulate the inductor, add extra cost. The price of each individual part is significantly increased due to the extra materials required. Following encapsulation the footprint of the component is increased to allow for potting material and housing. Potentially you have the issue of induced eddy currents in the housing itself, if the case is manufactured too tight or close to the ferrite.

There is a need to address these issues.

SUMMARY OF THE INVENTION

It would be advantageous to have improved inductor coil and method of cooling an inductor coil.

The object of the present invention is solved with the subject matter of the independent claims, wherein further embodiments are incorporated in the dependent claims. It should be noted that the following described aspects and examples of the invention apply also to the inductor coils and to the methods of cooling inductor coils.

In a first aspect, there is provided an inductor coil, comprising:

a first component;

a second component;

a length of conductor;

a heat sink.

The first component is located adjacent to the second component. A core is formed from the first component and the second component. A first part of the length of conductor is wound around at least the core to form a plurality of turns of conductor. The heat sink comprises a thermally conductive material. The heat sink comprises a first part and a second part. The first part of the heat sink has a first material and/or structural characteristic and the second part of the heat sink has a second material and/or structural characteristic different to the first material and/or structural characteristic. An inner surface of the first part of the heat sink is in contact with an outer surface of a part of the plurality of turns of conductor.

In an example, the first material and/or structural characteristic comprises a magnetic permeability and the second material and/or structural characteristic comprises a magnetic permeability greater than the magnetic permeability of the first part of the heat sink.

In an example, the first material and/or structural characteristic comprises a resistance or resistivity and the second material and/or structural characteristic comprises a resistance or resistivity less than the resistance or resistivity of the first part of the heat sink.

In an example, a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

In an example, the first material and/or structural characteristic comprises a conductivity or conductance and the second material and/or structural characteristic comprises a conductivity or conductance less than the resistance or resistivity of the first part of the heat sink.

In an example, a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

In an example, the heat sink is formed from a single piece, wherein the first structural characteristic of the first part is different to the second structural characteristic of the second part.

In an example, the first part of the heat sink has a thickness in an axial direction of the core that is less than a thickness of the second part of the heat sink in the axial direction of the core.

In an example, the first part of the heat sink comprises a plurality of slots or grooves.

In an example, the plurality of slots or grooves extend to the inner surface of the first part of the heat sink.

In an example, the plurality of slots or grooves extend to a boundary between the first part of the heat sink and the second part of the heat sink.

In an example, the plurality of slots or grooves each have a longitudinal axis that intersects with a central axis of the core.

In an example, the second part of the heat sink is configured to connect to a printed circuit board.

In an example, the heat sink comprises at least one third part located on at opposite side of the second part of the heat sink to the first part of the heat sink. The at least one third part of the heat sink is configured to transfer heat away from the second part of the heat sink.

In an example, a third part of the at least one third part the heat sink comprises a finned structured.

In an example, a third part of the at least one third part the heat sink comprises a connection terminal.

In an example, the connection terminal comprises the finned structure.

In an example, the connection terminal comprises a thick copper wire.

In an example, the second part of the heat sink comprises one or more pins configured for mechanical alignment with a printed circuit board and/or for mechanical fixation to the printed circuit board.

In an example, the first part and second part of the heat sink extend substantially in a direction perpendicular to a central axis of the core.

In an example, a core portion of the first component is spaced from a core portion of the second component to form a gap in the core. The first part of the length of conductor is wound around the core and the gap in the core. An inner part of the conductor of two or more turns of the conductor located around the core is spaced from a central axis of the core by at least one first distance. An inner part of the conductor of one or more turns of the conductor located around the gap in the core is spaced from the central axis by at least one second distance greater than the at least one first distance.

In an example, a core portion of the first component is spaced from a core portion of the second component to form a gap in the core. A spacer is located in the gap in the core to form a gap around the core. An outer surface of a portion of the spacer is located a distance from a central axis of the core that is greater than a distance from the central axis to an outer surface of the first component and an outer surface of the second component that form the core.

In an example, a dimension of the portion of the spacer adjacent to the outer surface of the first component and the outer surface of the second component in the direction of the central axis is greater than a dimension of the gap in the core in the direction of the central axis.

In an example, the outer surface of the portion of the spacer is configured to contact the one or more turns of conductor located around the gap in the core.

In an example, the spacer comprises a non-conductive material.

In an example, the spacer comprises a central hole configured to be located around the central axis.

In a second aspect, there is provided an inductor coil, comprising:

a first component;

a second component;

a length of conductor;

a heat sink;

The first component is located adjacent to the second component. A core is formed from the second component. A first part of the length of conductor is wound around at least the core to form a plurality of turns of conductor. The heat sink comprises a thermally conductive material. The heat sink comprises a first part and a second part. The first part of the heat sink has a first magnetic permeability and the second part of the heat sink has a second magnetic permeability greater than the first magnetic permeability. An inner surface of the first part of the heat sink is in contact with an outer surface of a part of the plurality of turns of conductor.

In an example, the first material and/or structural characteristic comprises a magnetic permeability and the second material and/or structural characteristic comprises a magnetic permeability greater than the magnetic permeability of the first part of the heat sink.

In an example, the first material and/or structural characteristic comprises a resistance or resistivity and the second material and/or structural characteristic comprises a resistance or resistivity less than the resistance or resistivity of the first part of the heat sink.

In an example, a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

In an example, the first material and/or structural characteristic comprises a conductivity or conductance and the second material and/or structural characteristic comprises a conductivity or conductance less than the resistance or resistivity of the first part of the heat sink.

In an example, a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

In an example, the heat sink is formed from a single piece, wherein the first structural characteristic of the first part is different to the second structural characteristic of the second part.

In an example, the first part of the heat sink has a thickness in an axial direction of the core that is less than a thickness of the second part of the heat sink in the axial direction of the core.

In an example, the first part of the heat sink comprises a plurality of slots or grooves.

In an example, the plurality of slots or grooves extend to the inner surface of the first part of the heat sink.

In an example, the plurality of slots or grooves extend to a boundary between the first part of the heat sink and the second part of the heat sink.

In an example, the plurality of slots or grooves each have a longitudinal axis that intersects with a central axis of the core.

In an example, the second part of the heat sink is configured to connect to a printed circuit board.

In an example, the heat sink comprises at least one third part located on an opposite side of the second part of the heat sink to the first part of the heat sink. The at least one third part of the heat sink is configured to transfer heat away from the second part of the heat sink.

In an example, a third part of the at least one third part the heat sink comprises a finned structured.

In an example, a third part of the at least one third part the heat sink comprises a connection terminal.

In an example, the connection terminal comprises the finned structure.

In an example, the connection terminal comprises a thick copper wire.

In an example, the second part of the heat sink comprises one or more pins configured for mechanical alignment with a printed circuit board and/or for mechanical fixation to the printed circuit board.

In an example, the first part and second part of the heat sink extend substantially in a direction perpendicular to a central axis of the core.

In an example, the core of the second component is spaced from the first component to form a gap between the core and the first component. The first part of the length of conductor is wound around the core and the gap between the core and the first component. An inner part of the conductor of two or more turns of the conductor located around the core are spaced from a central axis of the core by at least one first distance. An inner part of the conductor of one or more turns of the conductor located around the gap between the core and the first component is spaced from the central axis by at least one second distance greater than the at least one first distance.

In an example, the core of the second component is spaced from the first component to form a gap between the core and the first component. A spacer is located in the gap between the core and the first component to form a gap around the core. An outer surface of a portion of the spacer is located a distance from a central axis of the core that is greater than a distance from the central axis to an outer surface of the core of the second component.

In an example, a dimension of the portion of the spacer adjacent to the outer surface of the core of the second component in the direction of the central axis is greater than a dimension of the gap between the core and the first component in the direction of the central axis.

In an example, the outer surface of the portion of the spacer is configured to contact the one or more turns of conductor located around the gap between the core and the first component.

In an example, the spacer comprises a non-conductive material.

In an example, the spacer comprises a central hole configured to be located around the central axis.

In a third aspect, there is provided a method of cooling an inductor coil. The inductor coil comprises a first component, a second component, and a length of conductor. The first component is located adjacent to the second component. A core is formed from the first component and the second component. A first part of the length of conductor is wound around at least the core to form a plurality of turns of conductor. The method comprises:

- utilizing a heat sink, wherein the heat sink comprises a thermally conductive material, wherein the heat sink comprises a first part and a second part, wherein the first part of the heat sink has a first magnetic permeability and the second part of the heat sink has a second magnetic permeability greater than the first magnetic permeability; and
- wherein, utilizing the heat sink comprises contacting an inner surface of the first part of the heat sink with an outer surface of a part of the plurality of turns of conductor.

In an example, the first material and/or structural characteristic comprises a magnetic permeability and the second material and/or structural characteristic comprises a magnetic permeability greater than the magnetic permeability of the first part of the heat sink.

In an example, the first material and/or structural characteristic comprises a resistance or resistivity and the second material and/or structural characteristic comprises a resistance or resistivity less than the resistance or resistivity of the first part of the heat sink.

In an example, a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

In an example, the first material and/or structural characteristic comprises a conductivity or conductance and the second material and/or structural characteristic comprises a conductivity or conductance less than the resistance or resistivity of the first part of the heat sink.

In an example, a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

In an example, the heat sink is formed from a single piece, wherein the first structural characteristic of the first part is different to the second structural characteristic of the second part.

In an example, the first part of the heat sink has a thickness in an axial direction of the core that is less than a thickness of the second part of the heat sink in the axial direction of the core.

In an example, the first part of the heat sink comprises a plurality of slots or grooves.

In an example, the plurality of slots or grooves extend to the inner surface of the first part of the heat sink.

In an example, the plurality of slots or grooves extend to a boundary between the first part of the heat sink and the second part of the heat sink.

In an example, the plurality of slots or grooves each have a longitudinal axis that intersects with a central axis of the core.

In an example, the method comprises connecting the second part of the heat sink to a printed circuit board.

In an example, the heat sink comprises at least one third part located on at opposite side of the second part of the heat sink to the first part of the heat sink. The method comprises transferring heat away from the second part of the heat sink via the at least one third part of the heat sink.

In an example, a third part of the at least one third part the heat sink comprises a finned structured.

In an example, a third part of the at least one third part the heat sink comprises a connection terminal.

In an example, the connection terminal comprises the finned structure.

In an example, the connection terminal comprises a thick copper wire.

In an example, the second part of the heat sink comprises one or more pins. The method comprises mechanically aligning the one or more pins with a printed circuit board and/or mechanically fixing the one or more pins to the printed circuit board.

In an example, the first part and second part of the heat sink extend substantially in a direction perpendicular to a central axis of the core.

In an example, a core portion of the first component is spaced from a core portion of the second component to form a gap in the core. The first part of the length of conductor is wound around the core and the gap in the core. An inner part of the conductor of two or more turns of the conductor located around the core is/are spaced from a central axis of the core by at least one first distance. The method comprises spacing an inner part of the conductor of one or more turns of the conductor located around the gap in the core from the central axis by at least one second distance greater than the at least one first distance.

In an example, a core portion of the first component is spaced from a core portion of the second component to form a gap in the core. The method comprises locating a spacer in the gap in the core to form a gap around the core, wherein an outer surface of a portion of the spacer is located a distance from a central axis of the core that is greater than a distance from the central axis to an outer surface of the first component and an outer surface of the second component that form the core.

In an example, a dimension of the portion of the spacer adjacent to the outer surface of the first component and the outer surface of the second component in the direction of the central axis is greater than a dimension of the gap in the core in the direction of the central axis.

In an example, the method comprises contacting the outer surface of the portion of the spacer with the one or more turns of conductor located around the gap in the core.

In an example, the spacer comprises a non-conductive material.

In an example, the spacer comprises a central hole configured to be located around the central axis.

In a fourth aspect, there is provided a method of cooling an inductor coil. the inductor coil comprises a first component, a second component, and a length of conductor. The first component is located adjacent to the second component. A core is formed from the second component. A first part of the length of conductor is wound around at least the core to form a plurality of turns of conductor. The method comprises:

- utilizing a heat sink, wherein the heat sink comprises a thermally conductive material, wherein the heat sink comprises a first part and a second part, wherein the first part of the heat sink has a first magnetic permeability and the second part of the heat sink has a second magnetic permeability greater than the first magnetic permeability; and
- wherein utilizing the heat sink comprises contacting an inner surface of the first part of the heat sink with an outer surface of a part of the plurality of turns of conductor.

In an example, the first material and/or structural characteristic comprises a magnetic permeability and the second material and/or structural characteristic comprises a magnetic permeability greater than the magnetic permeability of the first part of the heat sink.

In an example, the first material and/or structural characteristic comprises a resistance or resistivity and the second material and/or structural characteristic comprises a resistance or resistivity less than the resistance or resistivity of the first part of the heat sink.

In an example, a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

In an example, the first material and/or structural characteristic comprises a conductivity or conductance and the second material and/or structural characteristic comprises a conductivity or conductance less than the resistance or resistivity of the first part of the heat sink.

In an example, a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

In an example, the heat sink is formed from a single piece, wherein the first structural characteristic of the first part is different to the second structural characteristic of the second part.

In an example, the first part of the heat sink has a thickness in an axial direction of the core that is less than a thickness of the second part of the heat sink in the axial direction of the core.

In an example, the first part of the heat sink comprises a plurality of slots or grooves.

In an example, the plurality of slots or grooves extend to the inner surface of the first part of the heat sink.

In an example, the plurality of slots or grooves extend to a boundary between the first part of the heat sink and the second part of the heat sink.

In an example, the plurality of slots or grooves each have a longitudinal axis that intersects with a central axis of the core.

In an example, the method comprises connecting the second part of the heat sink to a printed circuit board.

In an example, the heat sink comprises at least one third part located on at opposite side of the second part of the heat sink to the first part of the heat sink. The method comprises transferring heat away from the second part of the heat sink via the at least one third part of the heat sink.

In an example, a third part of the at least one third part the heat sink comprises a finned structured.

In an example, a third part of the at least one third part the heat sink comprises a connection terminal.

In an example, the connection terminal comprises the finned structure.

In an example, the connection terminal comprises a thick copper wire.

In an example, the second part of the heat sink comprises one or more pins and wherein the method comprises mechanically aligning the one or more pins with a printed circuit board and/or mechanically fixing the one or more pins to the printed circuit board.

In an example, the first part and second part of the heat sink extend substantially in a direction perpendicular to a central axis of the core.

In an example, the core of the second component is spaced from the first component to form a gap between the core and the first component. The first part of the length of conductor is wound around the core and the gap between the core and the first component. An inner part of the conductor of two or more turns of the conductor located around the core are spaced from a central axis of the core by at least one first distance. The method comprises spacing an inner part of the conductor of one or more turns of the conductor located around the gap between the core and the first component from the central axis by at least one second distance greater than the at least one first distance.

In an example, the core of the second component is spaced from the first component to form a gap between the core and the first component. The method comprises locating a spacer in the gap between the core and the first component to form a gap around the core, wherein an outer surface of a portion of the spacer is located a distance from a central axis of the core that is greater than a distance from the central axis to an outer surface of the core of the second component.

In an example, a dimension of the portion of the spacer adjacent to the outer surface of the core of the second component in the direction of the central axis is greater than a dimension of the gap between the core and the first component in the direction of the central axis.

In an example, the method comprises contacting the outer surface of the portion of the spacer with the one or more turns of conductor located around the gap between the core and the first component.

In an example, the spacer comprises a non-conductive material.

In an example, the spacer comprises a central hole configured to be located around the central axis.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
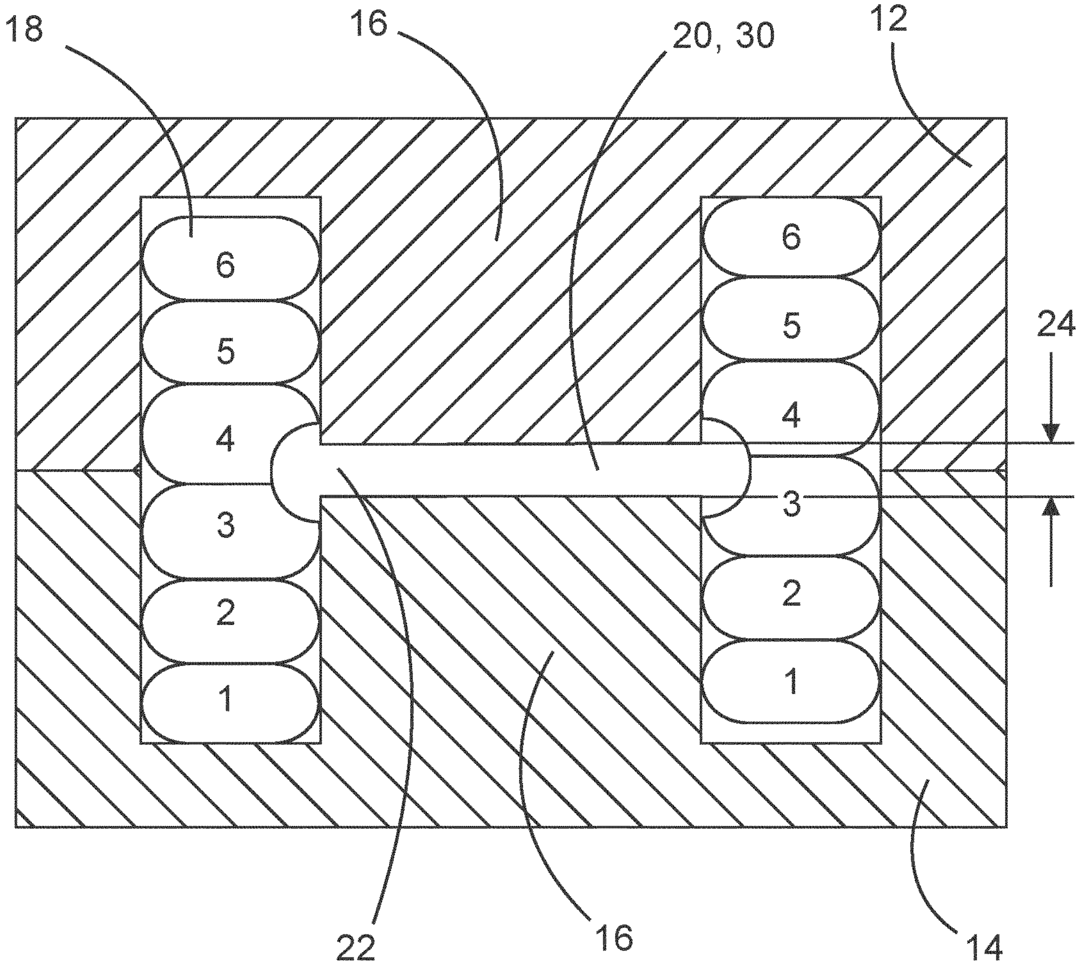
FIG. 1 shows a schematic set up of a vertical cross through an example of an inductor coil without the heat sink.

FIGS. 1-15 relate to inductor coils and methods of cooling inductor coils.

In an example, an inductor coil comprises a first component 12, a second component 14, a length of conductor 18, and a heat sink 100. The first component is located adjacent to the second component. A core 16 is formed from the first component and the second component. A first part of the length of conductor is wound around at least the core to form a plurality of turns of conductor. The heat sink comprises a thermally conductive material. The heat sink comprises a first part 90, 110 and a second part. The first part of the heat sink has a first material and/or structural characteristic and the second part of the heat sink has a second material and/or structural characteristic different to the first material and/or structural characteristic. An inner surface of the first part of the heat sink is in contact with an outer surface of a part of the plurality of turns of conductor.

Thus, an inductor coil with a core formed from two components has a heat sink 100 with a first part 90 that is acting as a thermal transfer element or material, that thermally conducts heat from the coil 18 while reducing eddy currents from being generated. It is to be noted that the first and second parts 90, 110 of the heat sink 100 can be combined into a single part, but the characteristics and technical benefits of the first thermal transfer element 90 remain the same.

In an example, the first material and/or structural characteristic comprises a magnetic permeability and the second material and/or structural characteristic comprises a magnetic permeability greater than the magnetic permeability of the first part of the heat sink.

In an example, the first material and/or structural characteristic comprises a resistance or resistivity and the second material and/or structural characteristic comprises a resistance or resistivity less than the resistance or resistivity of the first part of the heat sink.

In an example, a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

In an example, the first material and/or structural characteristic comprises a conductivity or conductance and the second material and/or structural characteristic comprises a conductivity or conductance less than the resistance or resistivity of the first part of the heat sink.

In an example, a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

In an example, the heat sink 100 is formed from a single piece, wherein the first structural characteristic of the first part 90 is different to the second structural characteristic of the second part 110.

In an example, the first part 110 of the heat sink has a thickness in an axial direction of the core that is less than a thickness of the second part of the heat sink in the axial direction of the core.

In an example, the first part 90 of the heat sink comprises a plurality of slots or grooves.

In an example, the plurality of slots or grooves extend to the inner surface of the first part of the heat sink.

In an example, the plurality of slots or grooves extend to a boundary between the first part of the heat sink and the second part of the heat sink.

In an example, the plurality of slots or grooves each have a longitudinal axis that intersects with a central axis of the core.

In an example, the second part of the heat sink is configured to connect to a printed circuit board 120.

In an example, the heat sink comprises at least one third part (130, 140 located on at opposite side of the second part of the heat sink to the first part of the heat sink. The at least one third part of the heat sink is configured to transfer heat away from the second part of the heat sink.

In an example, a third part of the at least one third part the heat sink comprises a finned structured 130.

In an example, a third part of the at least one third part the heat sink comprises a connection terminal 140.

In an example, the connection terminal comprises the finned structure.

In an example, the connection terminal comprises a thick copper wire.

In an example, the second part of the heat sink comprises one or more pins configured for mechanical alignment with a printed circuit board 120 and/or for mechanical fixation to the printed circuit board.

In an example, the first part and second part of the heat sink extend substantially in a direction perpendicular to a central axis of the core.

In an example, a core portion of the first component is spaced from a core portion of the second component to form a gap 20 in the core. The first part of the length of conductor is wound around the core and the gap in the core. An inner part of the conductor of two or more turns of the conductor located around the core are spaced from a central axis of the core by at least one first distance. An inner part of the conductor of one or more turns of the conductor located around the gap in the core is spaced from the central axis by at least one second distance greater than the at least one first distance.

In an example, a core portion of the first component is spaced from a core portion of the second component to form a gap 20 in the core. A spacer 30 is located in the gap in the core to form a gap 22 around the core. An outer surface of a portion of the spacer is located a distance from a central axis of the core that is greater than a distance from the central axis to an outer surface of the first component and an outer surface of the second component that form the core.

In an example, a dimension of the portion of the spacer adjacent to the outer surface of the first component and the outer surface of the second component in the direction of the central axis is greater than a dimension of the gap 24 in the core in the direction of the central axis.

In an example, the outer surface of the portion of the spacer is configured to contact the one or more turns of conductor located around the gap in the core.

In an example, the spacer comprises a non-conductive material.

In an example, the spacer comprises a central hole 32 configured to be located around the central axis.

In an example an inductor coil comprises a first component 12, a second component 14, a length of conductor 18, and a heat sink 100. The first component is located adjacent to the second component. A core 16 is formed from the second component. A first part of the length of conductor is wound around at least the core to form a plurality of turns of conductor. The heat sink comprises a thermally conductive material. The heat sink comprises a first part 90, 110 and a second part. The first part of the heat sink has a first material and/or structural characteristic and the second part of the heat sink has a second material and/or structural characteristic different to the first material and/or structural characteristic. An inner surface of the first part of the heat sink is in contact with an outer surface of a part of the plurality of turns of conductor.

Thus, an inductor coil with a core formed from one component has a heat sink 100 with a first part 90 that is acting as a thermal transfer element or material, that thermally conducts heat from the coil 18 while reducing eddy currents from being generated. It is to be noted that the first and second parts 90, 110 of the heat sink 100 can be combined into a single part, but the characteristics and technical benefits of the first thermal transfer element 90 remain the same.

In an example, the first material and/or structural characteristic comprises a magnetic permeability and the second material and/or structural characteristic comprises a magnetic permeability greater than the magnetic permeability of the first part of the heat sink.

In an example, the first material and/or structural characteristic comprises a resistance or resistivity and the second material and/or structural characteristic comprises a resistance or resistivity less than the resistance or resistivity of the first part of the heat sink.

In an example, a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

In an example, the first material and/or structural characteristic comprises a conductivity or conductance and the second material and/or structural characteristic comprises a conductivity or conductance less than the resistance or resistivity of the first part of the heat sink.

In an example, a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

In an example, the heat sink 100 is formed from a single piece, wherein the first structural characteristic of the first part 90 is different to the second structural characteristic of the second part 110.

In an example, the first part 110 of the heat sink has a thickness in an axial direction of the core that is less than a thickness of the second part of the heat sink in the axial direction of the core.

In an example, the first part 90 of the heat sink comprises a plurality of slots or grooves.

In an example, the plurality of slots or grooves extend to the inner surface of the first part of the heat sink.

In an example, the plurality of slots or grooves extend to a boundary between the first part of the heat sink and the second part of the heat sink.

In an example, the plurality of slots or grooves each have a longitudinal axis that intersects with a central axis of the core.

In an example, the second part of the heat sink is configured to connect to a printed circuit board 120.

In an example, the heat sink comprises at least one third part 130, 140 located on at opposite side of the second part of the heat sink to the first part of the heat sink. The at least one third part of the heat sink is configured to transfer heat away from the second part of the heat sink.

In an example, a third part of the at least one third part the heat sink comprises a finned structured 130.

In an example, a third part of the at least one third part the heat sink comprises a connection terminal 140.

In an example, the connection terminal comprises the finned structure.

In an example, the connection terminal comprises a thick copper wire.

In an example, the second part of the heat sink comprises one or more pins configured for mechanical alignment with a printed circuit board 120 and/or for mechanical fixation to the printed circuit board.

In an example, the first part and second part of the heat sink extend substantially in a direction perpendicular to a central axis of the core.

In an example, the core of the second component is spaced from the first component to form a gap 20 between the core and the first component. The first part of the length of conductor is wound around the core and the gap between the core and the first component. An inner part of the conductor of two or more turns of the conductor located around the core are spaced from a central axis of the core by at least one first distance. An inner part of the conductor of one or more turns of the conductor located around the gap between the core and the first component is spaced from the central axis by at least one second distance greater than the at least one first distance.

In an example, the core of the second component is spaced from the first component to form a gap 20 between the core and the first component. A spacer 30 is located in the gap between the core and the first component to form a gap 22 around the core. An outer surface of a portion of the spacer is located a distance from a central axis of the core that is greater than a distance from the central axis to an outer surface of the core of the second component.

In an example, a dimension of the portion of the spacer adjacent to the outer surface of the core of the second component in the direction of the central axis is greater than a dimension of the gap 24 between the core and the first component in the direction of the central axis.

In an example, the outer surface of the portion of the spacer is configured to contact the one or more turns of conductor located around the gap between the core and the first component.

In an example, the spacer comprises a non-conductive material.

In an example, the spacer comprises a central hole 32 configured to be located around the central axis.

In an example, an inductor coil comprises a first component 12, a second component 14, and a length of conductor 18. The first component is located adjacent to the second component. A core 16 is formed from the first component and the second component. A first part of the length of conductor is wound around at least the core to form a plurality of turns of conductor. An exemplar method of cooling the inductor coil comprises:

- utilizing a heat sink 100. The heat sink comprises a thermally conductive material. The heat sink comprises a first part 90, 110 and a second part. The first part of the heat sink has a first material and/or structural characteristic and the second part of the heat sink has a second material and/or structural characteristic different to the first material and/or structural characteristic; and
- utilizing the heat sink comprises contacting an inner surface of the first part of the heat sink with an outer surface of a part of the plurality of turns of conductor.

In an example, the first material and/or structural characteristic comprises a magnetic permeability and the second material and/or structural characteristic comprises a magnetic permeability greater than the magnetic permeability of the first part of the heat sink.

In an example, the first material and/or structural characteristic comprises a resistance or resistivity and the second material and/or structural characteristic comprises a resistance or resistivity less than the resistance or resistivity of the first part of the heat sink.

In an example, a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

In an example, the first material and/or structural characteristic comprises a conductivity or conductance and the second material and/or structural characteristic comprises a conductivity or conductance less than the resistance or resistivity of the first part of the heat sink.

In an example, a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

In an example, the heat sink 100 is formed from a single piece, wherein the first structural characteristic of the first part 90 is different to the second structural characteristic of the second part 110.

In an example, the first part 110 of the heat sink has a thickness in an axial direction of the core that is less than a thickness of the second part of the heat sink in the axial direction of the core.

In an example, the first part 90 of the heat sink comprises a plurality of slots or grooves.

In an example, the plurality of slots or grooves extend to the inner surface of the first part of the heat sink.

In an example, the plurality of slots or grooves extend to a boundary between the first part of the heat sink and the second part of the heat sink.

In an example, the plurality of slots or grooves each have a longitudinal axis that intersects with a central axis of the core.

In an example, the method comprises connecting the second part of the heat sink to a printed circuit board 120.

In an example, the heat sink comprises at least one third part 130, 140 located on at opposite side of the second part of the heat sink to the first part of the heat sink. The method comprises transferring heat away from the second part of the heat sink via the at least one third part of the heat sink.

In an example, a third part of the at least one third part the heat sink comprises a finned structured 130.

In an example, a third part of the at least one third part the heat sink comprises a connection terminal 140.

In an example, the connection terminal comprises the finned structure.

In an example, the connection terminal comprises a thick copper wire.

In an example, the second part of the heat sink comprises one or more pins. The method comprises mechanically aligning the one or more pins with a printed circuit board 120 and/or mechanically fixing the one or more pins to the printed circuit board.

In an example, the first part and second part of the heat sink extend substantially in a direction perpendicular to a central axis of the core.

In an example, a core portion of the first component is spaced from a core portion of the second component to form a gap 20 in the core. The first part of the length of conductor is wound around the core and the gap in the core. An inner part of the conductor of two or more turns of the conductor located around the core is/are spaced from a central axis of the core by at least one first distance. The method comprises spacing an inner part of the conductor of one or more turns of the conductor located around the gap in the core from the central axis by at least one second distance greater than the at least one first distance.

In an example, a core portion of the first component is spaced from a core portion of the second component to form a gap 20 in the core. The method comprises locating a spacer 30 in the gap in the core to form a gap 22 around the core. An outer surface of a portion of the spacer is located a distance from a central axis of the core that is greater than a distance from the central axis to an outer surface of the first component and an outer surface of the second component that form the core.

In an example, a dimension of the portion of the spacer adjacent to the outer surface of the first component and the outer surface of the second component in the direction of the central axis is greater than a dimension of the gap 24 in the core in the direction of the central axis.

In an example, the method comprises contacting the outer surface of the portion of the spacer with the one or more turns of conductor located around the gap in the core.

In an example, the spacer comprises a non-conductive material.

In an example, the spacer comprises a central hole 32 configured to be located around the central axis.

In an example, an inductor coil comprises a first component 12, a second component 14, and a length of conductor 18. The first component is located adjacent to the second component. A core 16 is formed from the second component. A first part of the length of conductor is wound around at least the core to form a plurality of turns of conductor. An exemplar method of cooling the inductor coil comprises:

- utilizing a heat sink 100. The heat sink comprises a thermally conductive material. The heat sink comprises a first part 90, 110 and a second part. The first part of the heat sink has a first material and/or structural characteristic and the second part of the heat sink has a second material and/or structural characteristic different to the first material and/or structural characteristic; and
- utilizing the heat sink comprises contacting an inner surface of the first part of the heat sink with an outer surface of a part of the plurality of turns of conductor.

In an example, the first material and/or structural characteristic comprises a magnetic permeability and the second material and/or structural characteristic comprises a magnetic permeability greater than the magnetic permeability of the first part of the heat sink.

In an example, the first material and/or structural characteristic comprises a resistance or resistivity and the second material and/or structural characteristic comprises a resistance or resistivity less than the resistance or resistivity of the first part of the heat sink.

In an example, a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

In an example, the first material and/or structural characteristic comprises a conductivity or conductance and the second material and/or structural characteristic comprises a conductivity or conductance less than the resistance or resistivity of the first part of the heat sink.

In an example, a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

In an example, the heat sink 100 is formed from a single piece, wherein the first structural characteristic of the first part 90 is different to the second structural characteristic of the second part 110.

In an example, the first part 110 of the heat sink has a thickness in an axial direction of the core that is less than a thickness of the second part of the heat sink in the axial direction of the core.

In an example, the first part 90 of the heat sink comprises a plurality of slots or grooves.

In an example, the plurality of slots or grooves extend to the inner surface of the first part of the heat sink.

In an example, the plurality of slots or grooves extend to a boundary between the first part of the heat sink and the second part of the heat sink.

In an example, the plurality of slots or grooves each have a longitudinal axis that intersects with a central axis of the core.

In an example, the method comprises connecting the second part of the heat sink to a printed circuit board 120.

In an example, the heat sink comprises at least one third part 130, 140 located on at opposite side of the second part of the heat sink to the first part of the heat sink. The method comprises transferring heat away from the second part of the heat sink via the at least one third part of the heat sink.

In an example, a third part of the at least one third part the heat sink comprises a finned structured 130.

In an example, a third part of the at least one third part the heat sink comprises a connection terminal 140.

In an example, the connection terminal comprises the finned structure.

In an example, the connection terminal comprises a thick copper wire.

In an example, the second part of the heat sink comprises one or more pins. The method comprises mechanically aligning the one or more pins with a printed circuit board 120 and/or mechanically fixing the one or more pins to the printed circuit board.

In an example, the first part and second part of the heat sink extend substantially in a direction perpendicular to a central axis of the core.

In an example, the core of the second component is spaced from the first component to form a gap 20 between the core and the first component. The first part of the length of conductor is wound around the core and the gap between the core and the first component. An inner part of the conductor of two or more turns of the conductor located around the core are spaced from a central axis of the core by at least one first distance. The method comprises spacing an inner part of the conductor of one or more turns of the conductor located around the gap between the core and the first component from the central axis by at least one second distance greater than the at least one first distance.

In an example, the core of the second component is spaced from the first component to form a gap 20 between the core and the first component. The method comprises locating a spacer 30 in the gap between the core and the first component to form a gap 22 around the core. An outer surface of a portion of the spacer is located a distance from a central axis of the core that is greater than a distance from the central axis to an outer surface of the core of the second component.

In an example, a dimension of the portion of the spacer adjacent to the outer surface of the core of the second component in the direction of the central axis is greater than a dimension of the gap 24 between the core and the first component in the direction of the central axis.

In an example, the method comprises contacting the outer surface of the portion of the spacer with the one or more turns of conductor located around the gap between the core and the first component.

In an example, the spacer comprises a non-conductive material.

In an example, the spacer comprises a central hole 32 configured to be located around the central axis.

Thus, a new heat sink technology has been developed that in specific embodiments utilizes a optimises the heat transfer from the windings of an inductor coil to a medium such as a printed circuit board or extended heat sink. Furthermore, eddy currents are reduced or inhibited from being generated in the thermally conductive heatsink when exposed to alternating currents associated with typical applications as switch mode converters, and consequently less heat is initially generated that then needs to be transferred by the heat sink.

In specific embodiments:

1) The heatsink design takes the heat away from the coil but from the same plane that the terminals of the coils exit for mounting to such mediums as a printed circuit board. This allows for the ability to eliminate the need for an enclosed inductor with complete encapsulation, having to pot the electronics entirely or rely on expensive thermal solutions.
2) With this design an embodiment is provided that reduces any eddy current build up due to the thermally conductive material being in close proximity to alternating field generated from the coil.

Specific embodiments are now described, where reference is again made to FIGS. 1-15.

FIG. 1 shows a cross-section through a detailed specific embodiment of an inductor coil, prior to the heat sink being placed in contact with turns of the conductor. A first component part 12 of a ferrite material is shown at the top. This has a base portion, and a cylindrical core portion extending downwards. Outer limb portions extend downwards and are spaced from the core portion and within which turns of a conductor 18 in the form of a multi-strand wire can be located. Here six turns are shown, but there can be more or less turns than this. A second component part 14 again of a ferrite material is shown at the bottom. This again has a base portion, and a cylindrical core portion 16 extending upwards, and outer limb portions that extend upwards and spaced from the core portion and within which turns of the conductor 18 can be located. The core portions of the of the first component part of the second component part form a core 16. A centre 20 in the core is shown between the two component parts, with a centre gap has a dimension 24 that can for example be 1 mm, but can be greater than or less than this. As discussed, six turns of the multi-strand wire (or Litz wire) are shown would around the core and the gap in the core, but there can be less than or more than this. In addition to a gap 20 being provided between the cores, a gap 22 is formed around this central gap and the wire turns do not encroach into this gap 22, and as shown wire turns have been deformed to keep them out of this gap 22. Thus FIG. 1 illustrates that the cross section for each turn is kept the same, but under compression free space is created to avoid the gap created by the ferrite. The central gap 20 is the area in which non-conductive material spacer 30 can be placed that forms the gap 22, discussed in more detail below.

Figure 2:
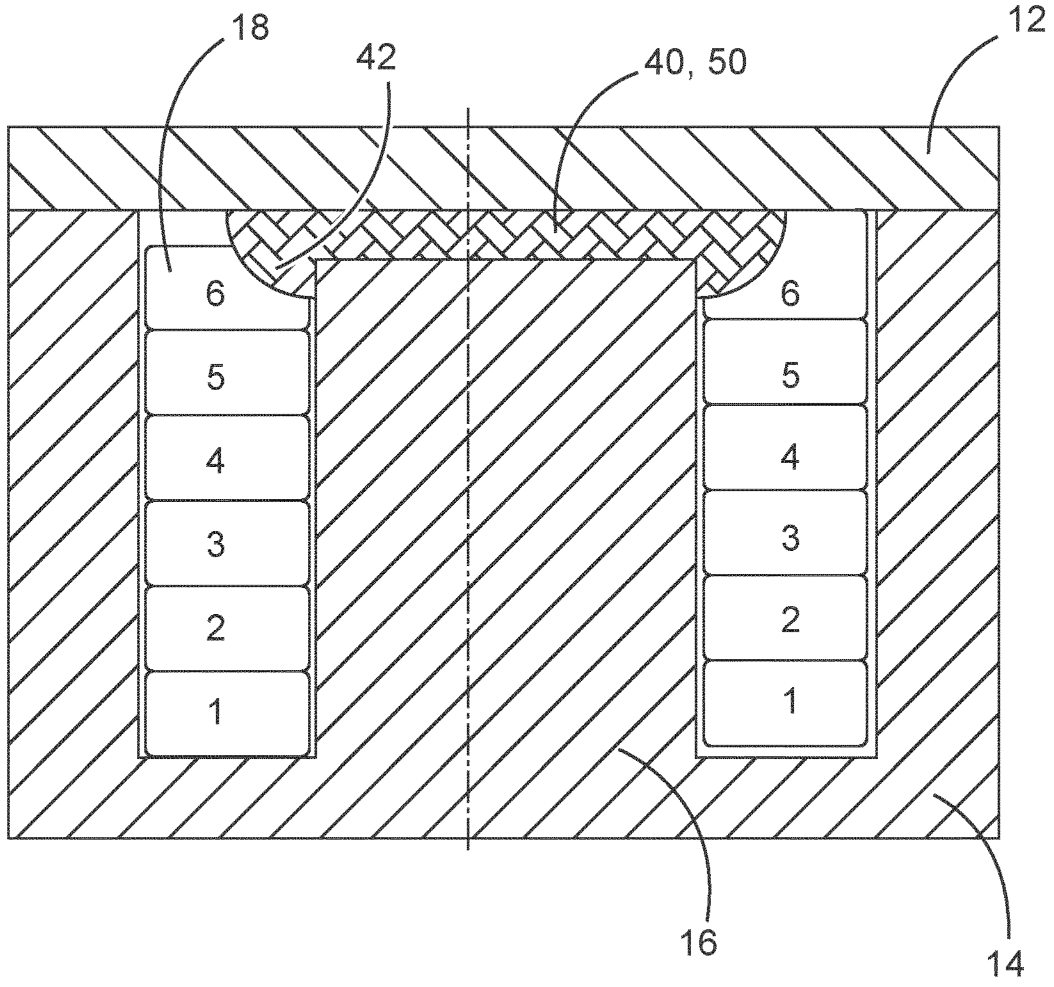
FIG. 2 shows a schematic set up of a vertical cross through an example of an inductor coil without the heat sink.

FIG. 2 shows a cross-section through a detailed specific embodiment of an inductor coil, again prior to the heat sink being placed in contact with turns of the conductor. A first component part 12 of a ferrite material is shown at the top. This has a base portion. A second component part 14 again of a ferrite material shown at the bottom. This again has a base portion, and has a cylindrical core 16 extending upwards. Outer limb portions extend upwards and are spaced from the core, within which turns of a conductor 18 in the form of a multi-strand wire can be located. The core 16 is spaced from the base portion of the first component part to form a gap 40 in the core. Six turns of the multi-strand wire are shown wound around the core and the gap in the core, but there can be less than or more than this. In addition to a gap 40 being provided between the core and the first component part, a gap 42 is formed effectively in the core between the core and the first component part, and the wire turns do not encroach into this gap 42, and as shown wire turns have been deformed to keep them out of this gap 42. Thus again FIG. 2 illustrates that the cross section for each turn is kept the same, but under compression free space is created to avoid the gap created by the ferrite. The top gap 40 is the area in which non-conductive material spacer 50 can be placed that forms the gap 42, discussed in more detail below.

Figure 3:
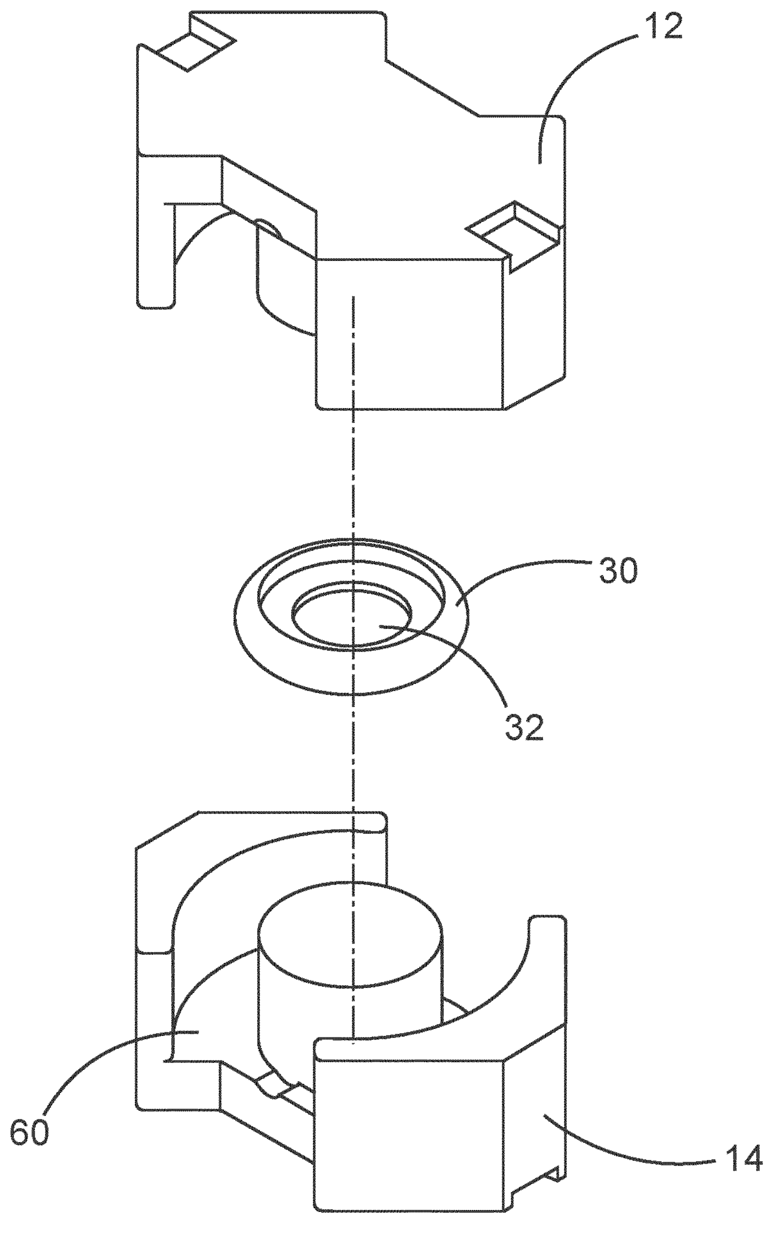
FIG. 3 shows a schematic set up of an example of component parts of an inductor coil without the conductor and without the heat sink.

FIG. 3 shows a detailed specific embodiment of an inductor coil, for example as shown in FIG. 1 that has a central gap 20 in the core, the conductor 18 is not shown and the heat sink is also not shown. The first component part 12 and the second component part 14 are shown separated from one another, and the spacer 30 is shown that also has a central hole 32. As shown there is a space 60 in both the first and second component parts for windings of the conductor 18 in the form of a multi-strand wire. Thus this figure illustrates a non-conductive insert (spacer 30) that extends over the pole length. This can be used with and without the hole in the centre 32 of the non-conductive part. This can be added during the compression or after the compression of the wires to ensure that the wires do not enter the fringing field after compression.

Figure 4:
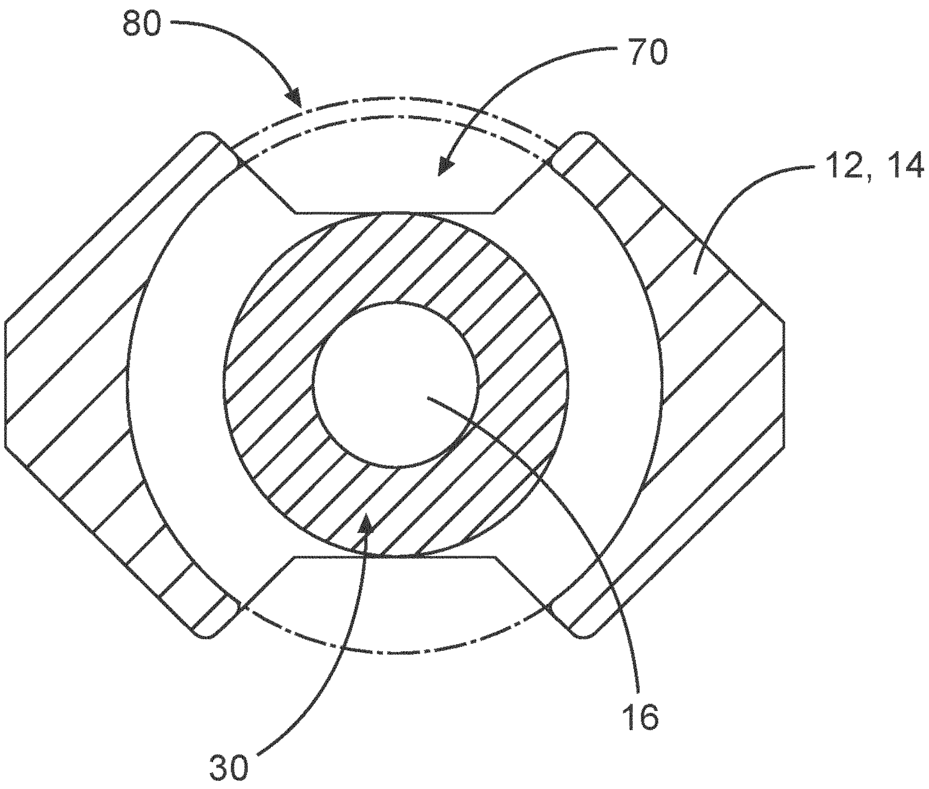
FIG. 4 shows a schematic set up of a horizontal cross section through an exemplar inductor coil without the heat sink.

FIG. 4 shows a representative cross-section through an inductor coil, showing a through the outer limbs of a first component part 12 or a second component part 14, showing top surface of core 16 of one of the 2 component parts. With a cross-section through the centre of the gap spacer 30 the outer limbs of the first or second component part or actually also not actually been cut through but are the top surface. The turns of the wire of the conductor 18 can be pushed sideways by the spacer 30, and/or the turns of the wire can be deformed by the spacer 30 in the region of central gap 20 to keep the turns of the wire conductor 18 out of the fringing field. Thus the ring spacer 30 can be used to either compress the conductive wire 18 or to allow the bundle or strand to jump over the space containing the fringing field, and the wire could form a bump 80 outside of the core shape where space 70 may be free for the wire to enter. Thus the spacer 30 by keeping the terms of the wire conductor out of the fringing field, produces heat production, improves thermal stability, and less heat is generated that has to be transferred by the heat sink.

Figure 5:
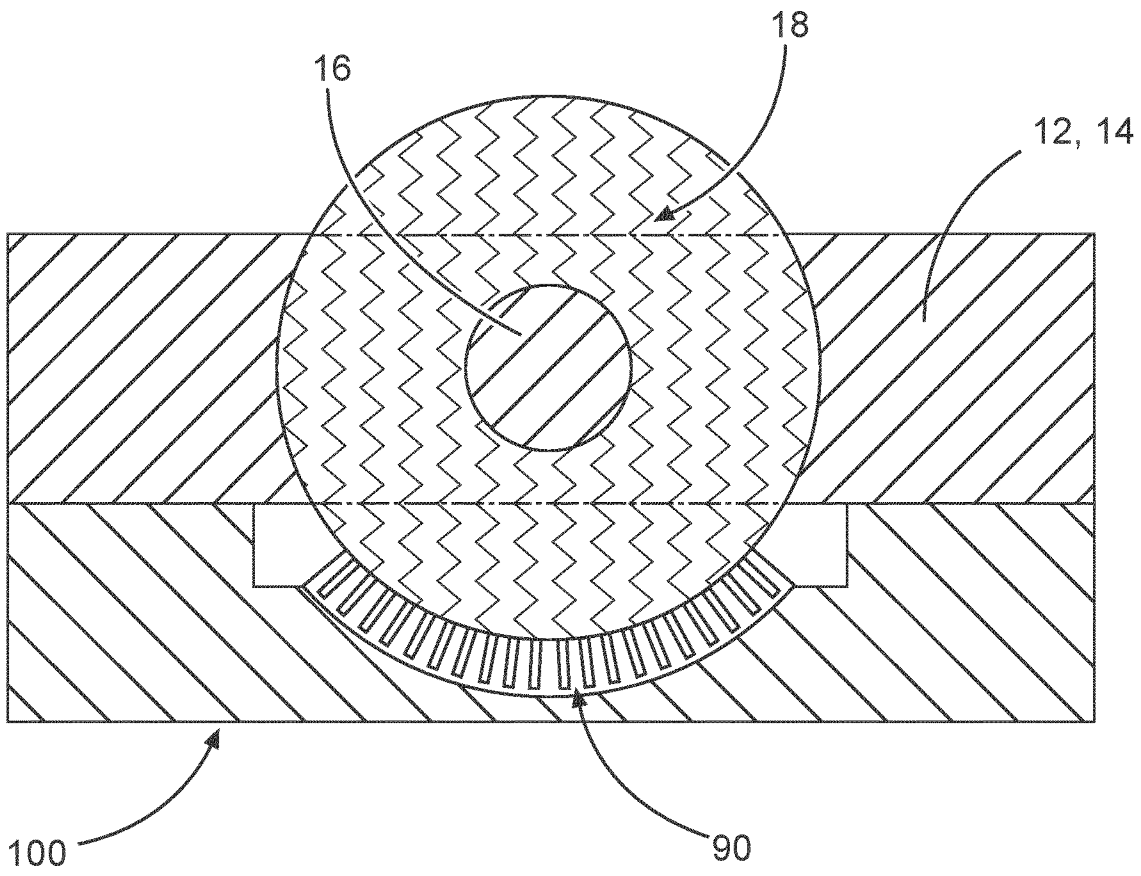
FIG. 5 shows a schematic set up of a horizontal cross section through an exemplar inductor coil with the heat sink.

FIG. 5 is a representation of a horizontal cross section through an inductor coil, with a heat sink 100. The heatsink has a first part 90 that has a series of grooves or slots and this first part is in contact and thermally bonded with the wire turnings and is in contact with a second part of the heat sink, that is itself in contact with the ferrite material of the first component 12 and/or the second component 14. The first part 90 of the heat sink 100 can be considered to be an eddy heat sink, in that the slots or grooves reduce the volume of magnetic permeable material adjacent to the wire turnings, and the eddy reduction heatsink 90 reduces eddy current flow within the thermally conductive heatsink, and therefore less heat is generated.

Figure 6:
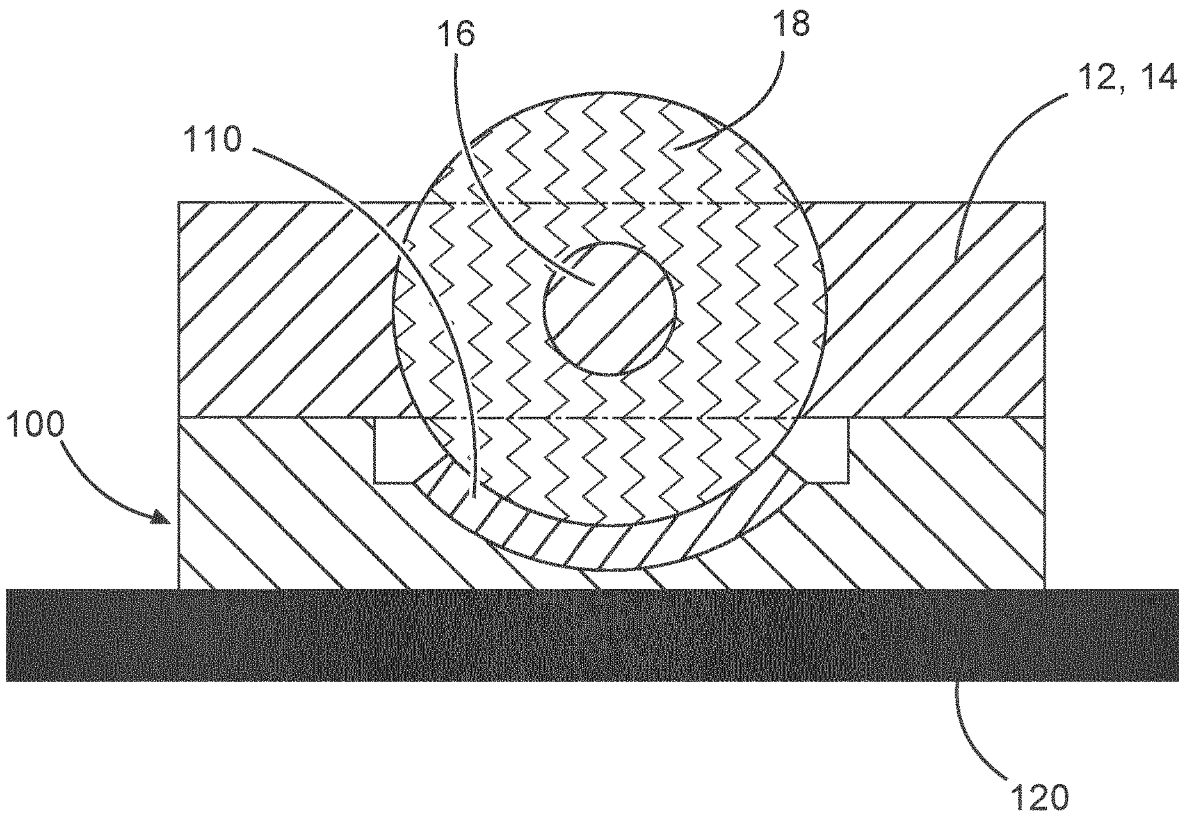
FIG. 6 shows a schematic set up of a horizontal cross section through an exemplar inductor coil with the heat sink connected to a printed circuit board.

FIG. 6 is a representation of a horizontal cross section through an inductor coil, with a heat sink 100. The heatsink has a first part 110 that is in contact and thermally bonded with the wire turnings and is in contact with a second part of the heat sink, that is itself in contact with the ferrite material of the first component 12 and/or the second component 14. The first part 110 of the heat sink 100 is thinner than the second part of the heat sink, and can again be considered to be an eddy heat sink, in that being thin the volume of magnetic permeable material adjacent to the wire turnings is reduced, and the eddy reduction heatsink 110 reduces eddy current flow within the thermally conductive heatsink, and therefore less heat is generated. It is to be noted that the first part of the heat sink 90 described with respect to FIG. 5 that has grooves and slots can also be the heat sink 110 that is thinner than the second part of the heat sink as described with respect to FIG. 6. Thus in FIG. 6 the heatsink touches the ferrite material but uses a thermally conductive pad or material to provide a thermal conductive path but reducing eddy current generation by creating a low magnetics permeable space, and in this embodiment the second part of the heat sink is shown in contact with a printed circuit board (PCB) 120.

Figure 7:
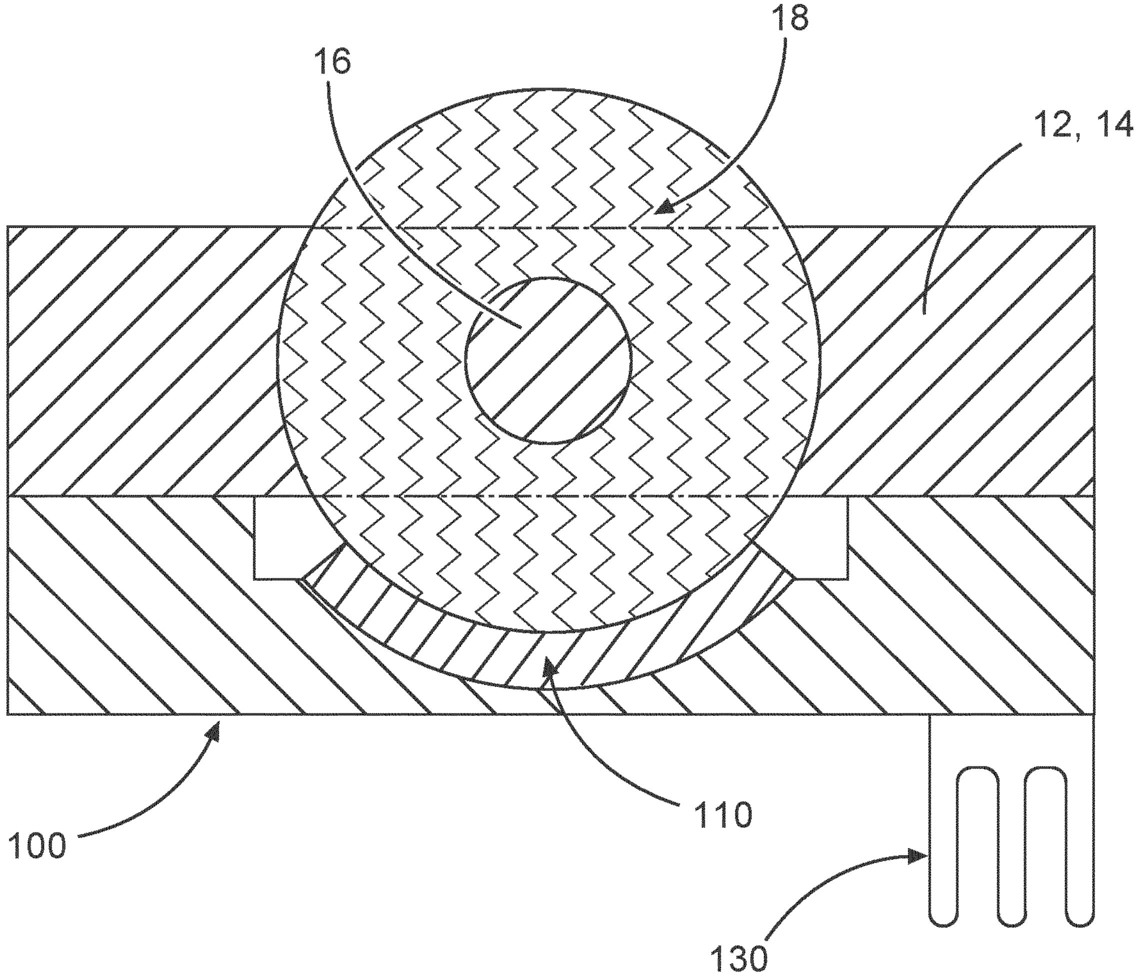
FIG. 7 shows a schematic set up of a horizontal cross section through an exemplar inductor coil with the heat sink having a finned heat transmission element.

FIG. 7 is an illustration of an inductor coil and heatsink of the same nature as shown in FIG. 6, but with the option of the heatsink having a third part 130 for improved heat transmission to ambient via the screw terminals on the heatsink or press fit of the pins or via a finned structure for heat transmission to ambient.

Figure 8:
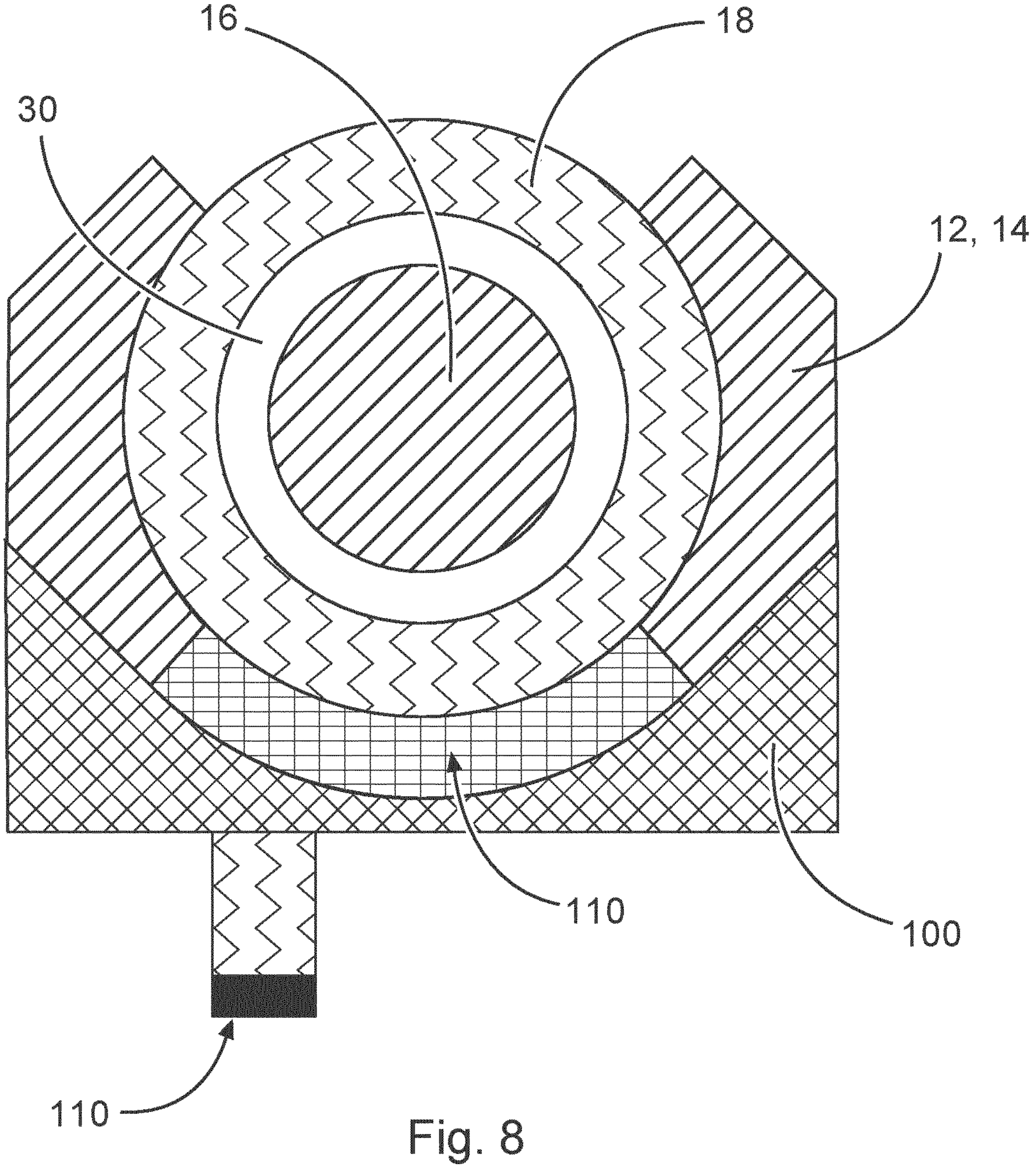
FIG. 8 shows a schematic set up of a horizontal cross section through an exemplar inductor coil with the heat sink having a wire connection terminal.

FIG. 8 is an illustration of an inductor coil and heatsink of the same nature as shown in FIG. 6 (and is of a form as shown in FIGS. 3-4), but with the embodiment of the eddy space as a combinational heat reduction part and an improved thermal path from the novel heatsink solution. Here the third part of the heat sink is in the form of a connection terminal 140 that is a thick copper wire, and that helps to transfer heat away from the inductor coil.

Figure 9:
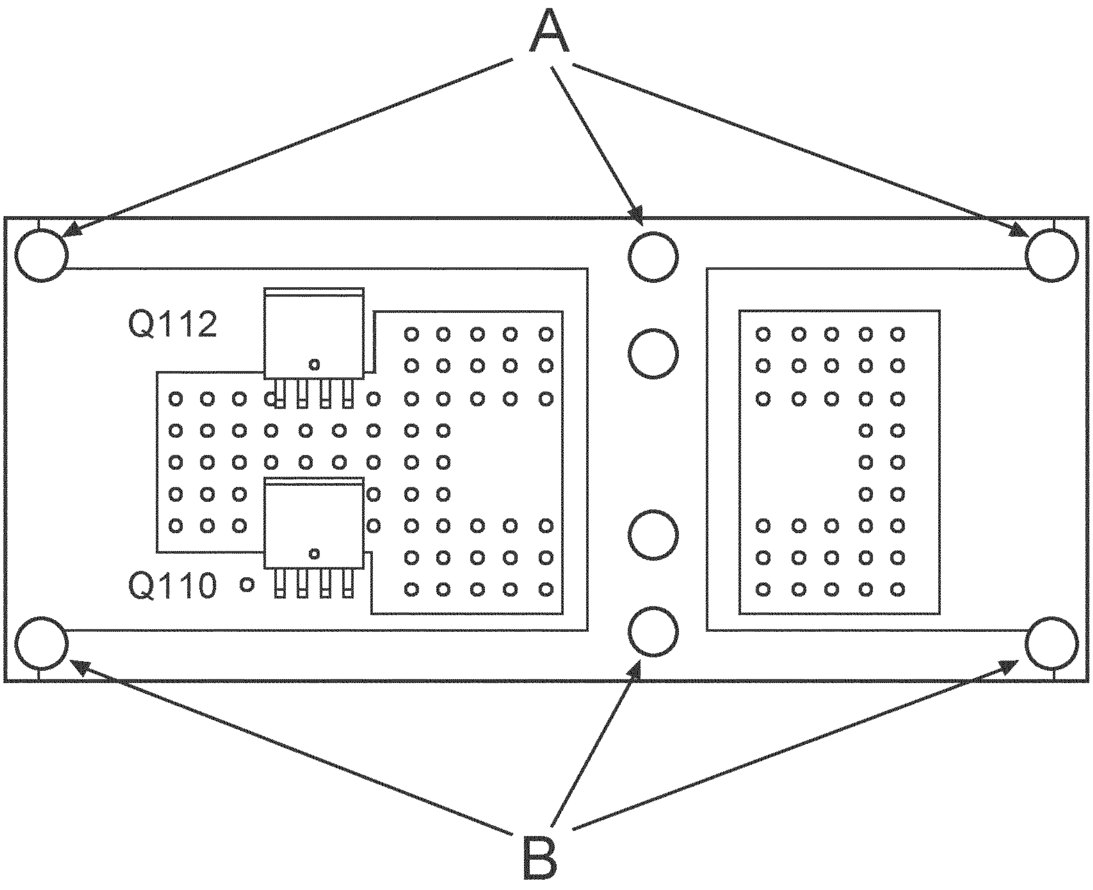
FIG. 9 shows a schematic set up of how an exemplar inductor coil can be mounted to a printed circuit board.

FIG. 9 is an illustration of how screw terminals from heatsink base can be used to mount the inductor coil and heat sink to a printed circuit board in which the thermal path is transferred from the copper on the printed circuit board to mounting holes to a mechanical enclosure. In FIG. 9 "A" represents how PCB mounting holes can be utilised, where copper is connected to a ground plane and inductor coil heatsink so that the thermal path from the copper to the mechanical housing is improved, and where "B" represents holes for screwing the inductor coil base and heatsink to the PCB for an additional thermal path from the inductor coil, where copper resist can be removed to improve the heat transfer to the printed circuit board.

Figure 10:
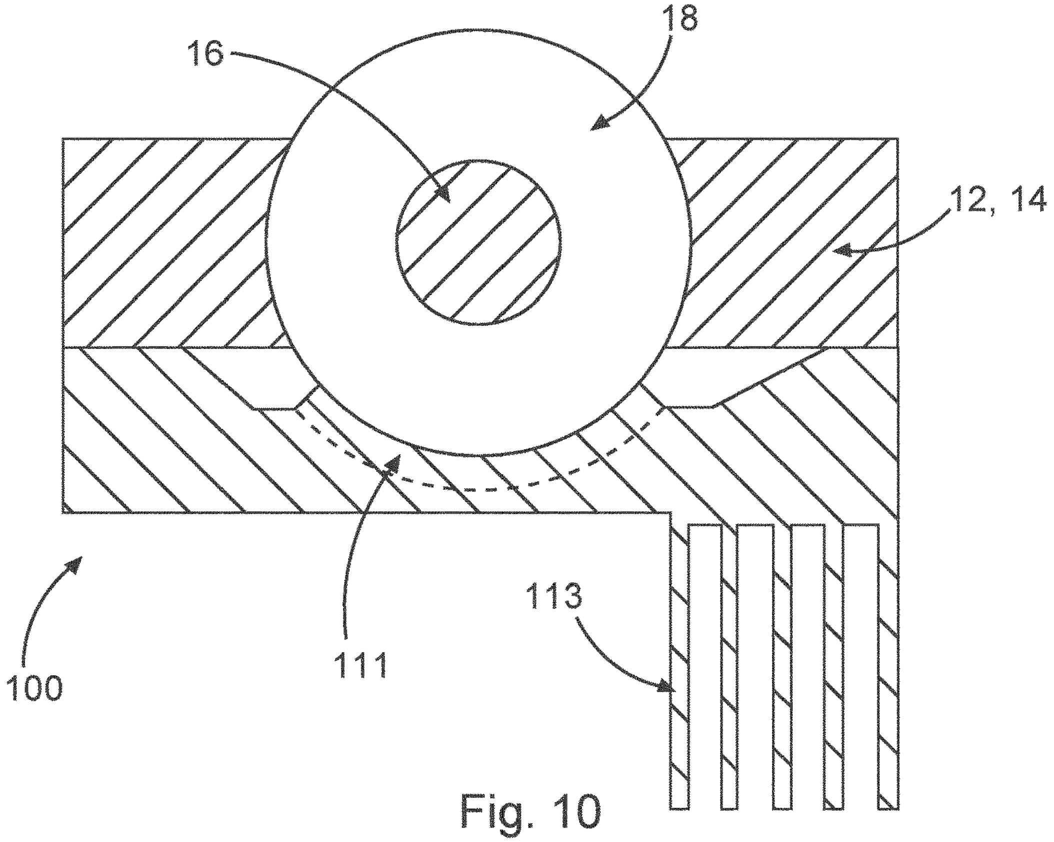
FIG. 10 shows a schematic set up of a horizontal cross section through an exemplar inductor coil with the heat sink having a finned heat transmission element.

FIG. 10 shows an inductor coil comprising a first part 12 and second part 14, which are combined forming a magnetic flux cage with a core 16 and a length of conductor 18 forming a coil and a heat sink, or in other words heat transfer element 100, connected at least thermally to the winding of a length of conductor 18 on a part of the conductor's 18 outer surface. The heat transfer element comprises a heat transmitting area 111 and a heat sink area 113 and the energy is transmitted from heat transmitting area 111 to the heat sink area 113. The heat sink area 113 may be a part of the element 100 designed to work as a cooling body. The heat sink are may also be a mounting plate, which is designed to create a good thermal contact to a heat sink. The material of the heat transfer element or heat sink element 100 may be aluminum. The heat transmitting area is in detail designed to transmit heat preferably in a radial direction away from the coil conductor 18 by modifications of the material structure on a sub millimeter scale. The modifications in the heat transmitting area 111 may be thin slots or laminations, which locally comprise thermally conductive layers which are extended in a radial direction but less extended in a circumferential direction related to the central axis of the core 16. The heat sink area 113 of the element 100 may be structured or coated in order to improve head transfer to the environment or to a cooling device. With the help of this arrangement the heat which is created in the length of conductor 18 is at least partially transferred through the heat transfer area of element 100 and transmitted to the heat sink area 113.

Figure 11:
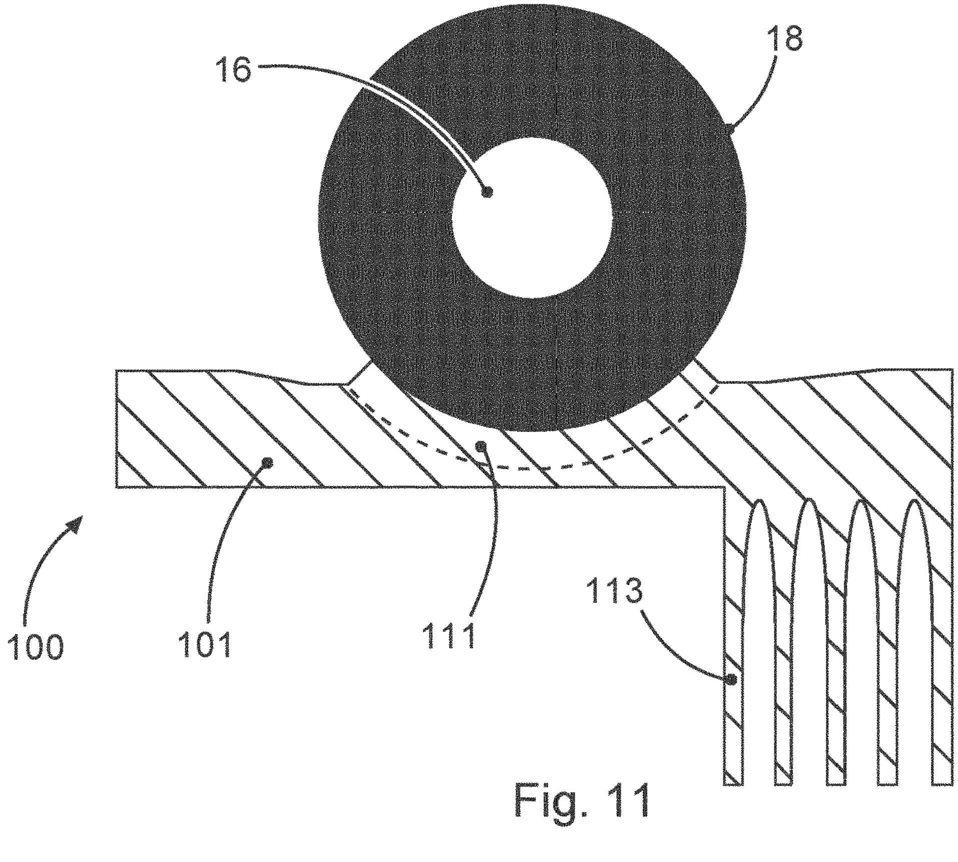
FIG. 11 shows a schematic set up of a horizontal cross section through an exemplar inductor coil with the heat sink having a finned heat transmission element, where the magnetic flux cage is not shown.

FIG. 11 shows an embodiment without a magnetic flux cage. Then the magnetic field is creating magnetic fields which are even more penetrating the heat transfer element. These magnetic fields would create strong heat production based on eddy current effects in case of high alternating current frequencies in the heat transfer element if this element would have a high electrical conductivity in the heat transmitting area 111. Accordingly, the eddy current power density is reduced by use of an anisotropic or reduced electrical conductivity in the heat transmitting area, partial volume 111, which is close to the windings of the coil 18.

Figure 12:
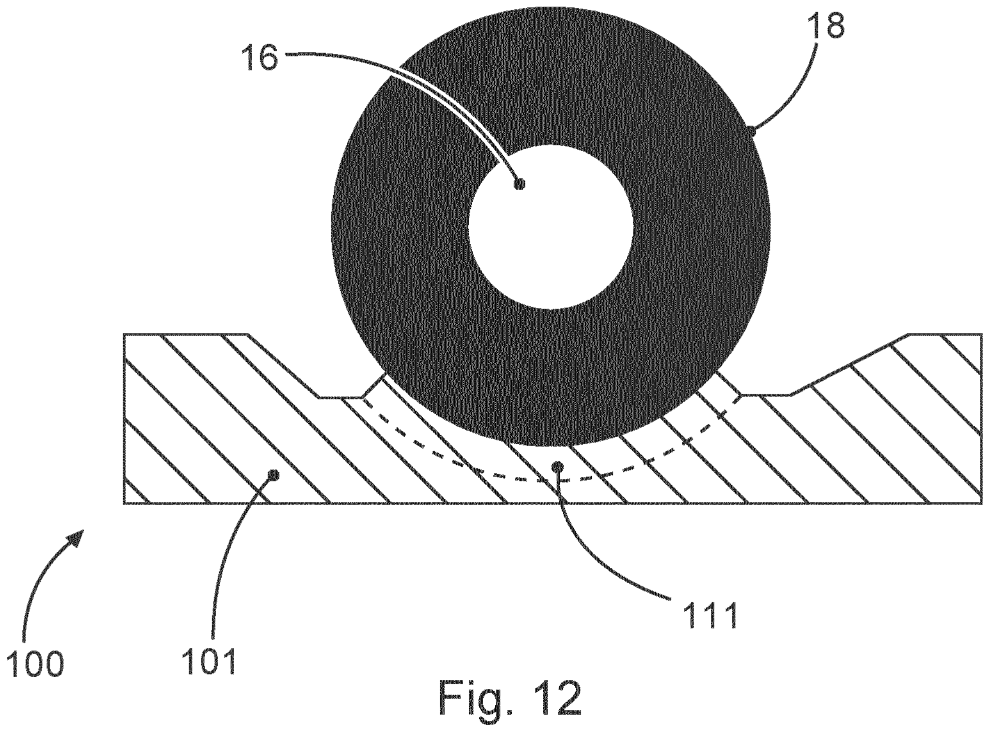
FIG. 12 shows a schematic set up of a horizontal cross section through an exemplar inductor coil with the heat sink having a finned heat transmission element, where the magnetic flux cage is not shown.

FIG. 12 shows a similar embodiment without heat transfer area 113. Here the heat is transferred to an external heat sink, which is mounted thermally conductive to the heat transfer element 100. The material 101 may be a metal alloy. The heat transfer element 100 may comprise two locally different chemical element mixtures in the alloy in order to reduce electrical conductivity in the heat transfer area 111 compared to the conductivity in the heat sink area 101 or 113 (see FIG. 11 as well). In many cases the electrical and thermal conductivity of the material 101 behave similarly, then thermal conductivity is high when electrical conductivity is low.

Figure 13:
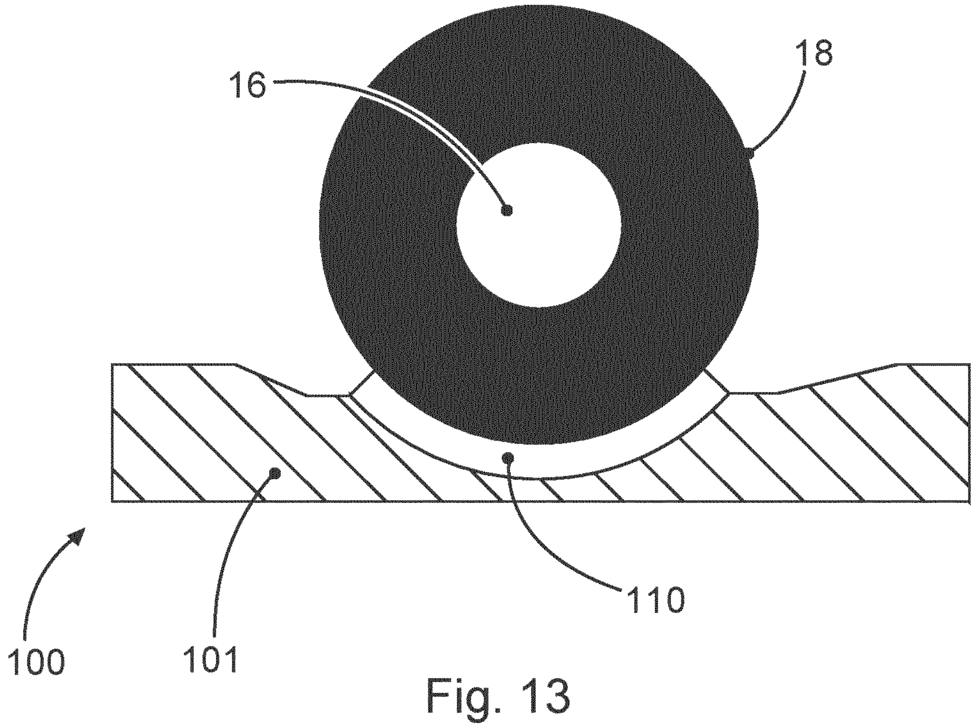
FIG. 13 shows a schematic set up of a horizontal cross section through an exemplar inductor coil with the heat sink having a finned heat transmission element, where the magnetic flux cage is not shown.

FIG. 13 shows an embodiment with a heat transfer element 110 between the heat transfer or heat sink element 100 and the coil conductor 18. The material of the heat transfer element 110 is different from the material 101 of the heat sink element 100. The heat transfer element 110 may be made from heat transfer material, which has a high thermal conductivity compared with other polymers but a very low electrical conductivity like an insulation material. The benefit of this embodiment is that the heat which is produced in the high power coil 18 can be transmitted through the transfer element 110 to the transfer and heat sink element 100 but only little eddy current losses are created in the transfer element 110 due to its low electrical conductivity. Both the thermal and the electrical conductivity of the material 101 may be high and nevertheless the eddy current losses will be low. The same kind of heat transfer element 110 can the heat transfer area 111 in embodiments which are shown in FIGS. 10, 11, 12. The preferred heat transfer material is thermally conductive but electrically insulating material, which may consist of a silicone type material like SILPAD by Henkel material or other polymers or mixtures from polymers with particles.

Figure 14:
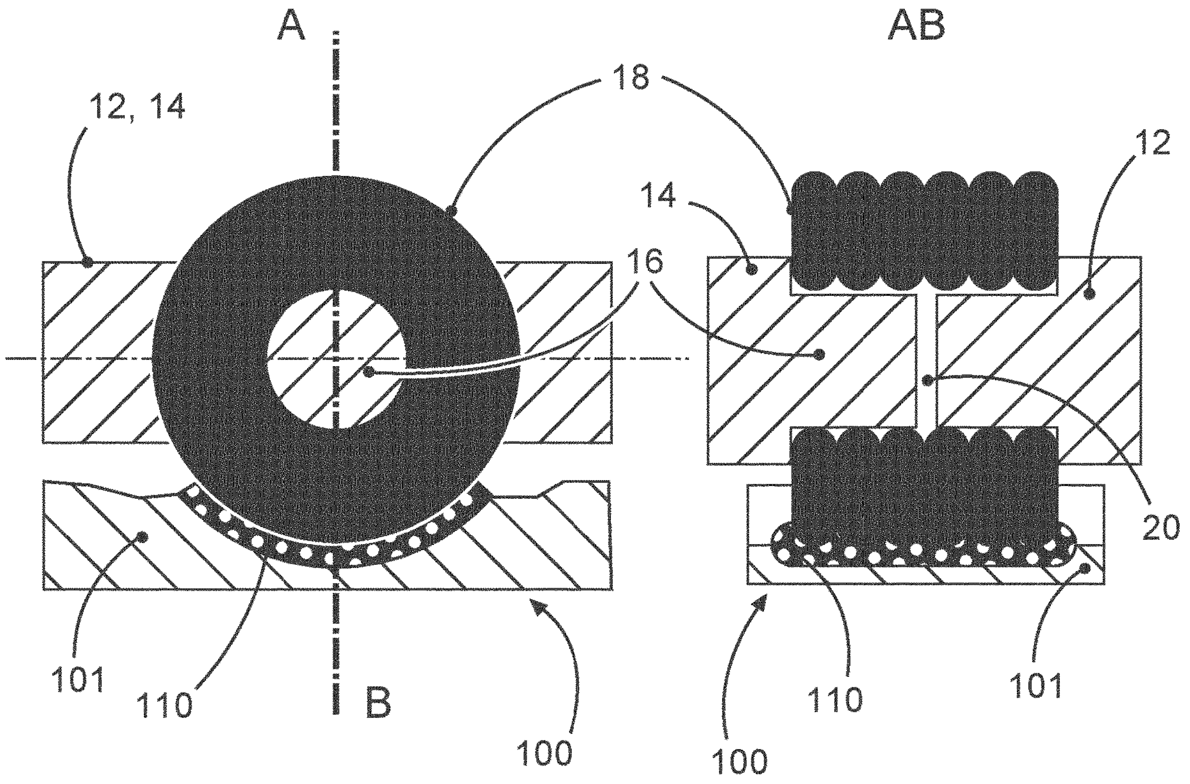
FIG. 14 shows a schematic set up of a horizontal cross section through an exemplar inductor coil and a vertical cross section through the inductor coil.

FIG. 14 shows an example with a regular winding, which has no freedom of the eddy current creating space around the gap 20. The cross-sectional view AB shows how the thermal contact is made between transmitting element 110 and coil conductor 18 and heat sink element 100.

Figure 15:
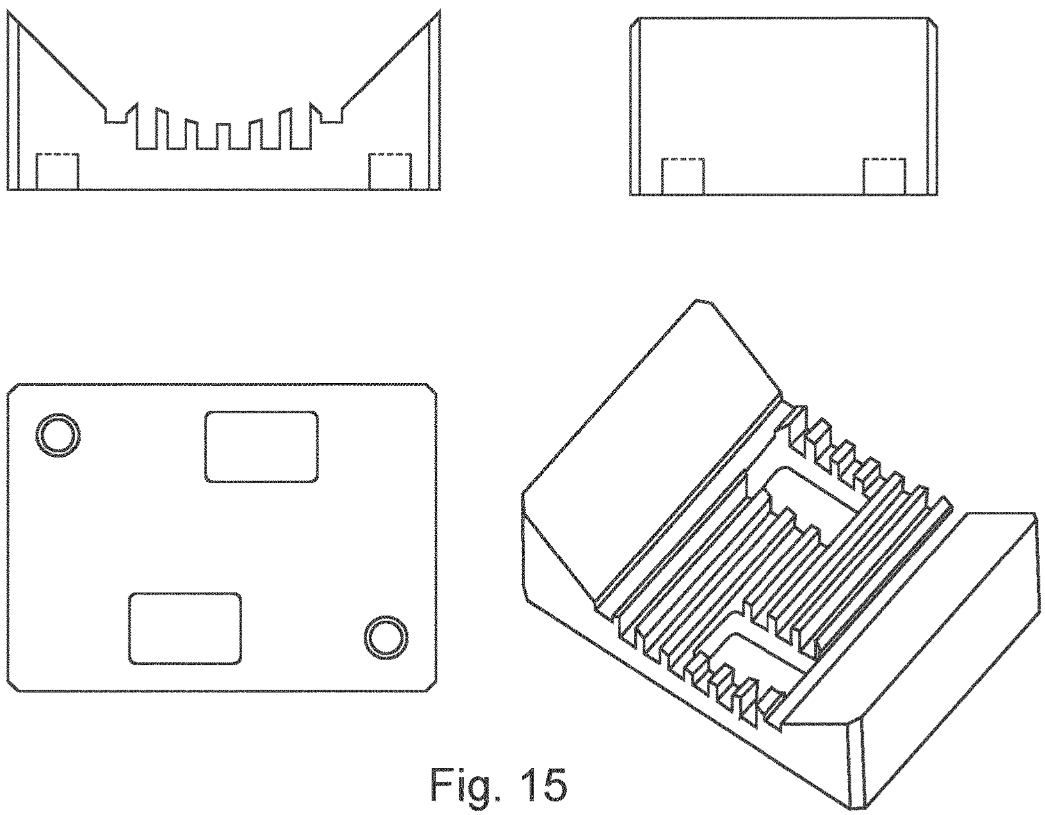
FIG. 15 shows views of an exemplar heatsink

FIG. 15 shows views of an exemplar heatsink. This heatsink is made from a single piece of extruded aluminium. Features on the first part and second part, of the single piece, have differences in structural characteristics as discussed above. The slots within the aluminium change the average electrical resistance of the volume of material by breaking up the circulating eddy currents. The second part, which is away from the current field, can be a solid structure as eddy losses here are low and optimal thermal transfer can be achieved. Slots within the aluminium will be filled with thermal epoxy, this thermal epoxy will also bridge any gap between the first part with slots and the coil itself as thermal epoxy is 50 times more effective than air in most cases. Mounting techniques can consist of thermal transfer through PCB to case through thermal vias and mounting holes, removing and solder resist transfer from aluminium to copper and thermal via and PCB mounting holes to transfer to case. Other methods such as PCB cut-outs to allow the aluminium heatsink to pass through the PCB to mount directly on the casing or larger heatsink that is also providing heatsinking for any switching MOSFETS or power electronics.

Additional Examples

In one example the thermal conductivity of the heat transmitting area 111 is providing an anisotropic thermal conductivity in a sub millimeter scale. Anisotropic means that the thermal conductivity is high due to the local structure and local material properties but the thermal conductivity is low at least in the circumferential direction according to the central axis of core 16 or in other words the thermal conductivity in the heat transfer region is low more or less tangential to the surface of the coil 18 but high in the radial direction. The low tangential thermal conductivity is achieved by a selection of radial laminate structure with laminated thin layers of conductive material with radial plane direction and little tangential thickness or small slots in radial direction which are filled with air or polymer or oil. The majority of the heat transfer element 100 is a good thermal conductor with an isotropic thermal conductivity.

In one example the electrical conductivity of the heat transmitting area 111 is providing an anisotropic electrical conductivity in a sub millimeter scale. Anisotropic means that the electrical conductivity is high due to the local structure and local material properties but the electrical conductivity is low at least in the circumferential direction according to the central axis of core 16 or in other words the electrical conductivity in the heat transfer region is low more or less tangential to the surface of the coil 18 but high in the more or less radial direction. The low tangential electrical conductivity is achieved by a selection of radial laminate structure with laminated thin layers of conductive material with radial plane direction and little tangential thickness or small slots in radial direction which are filled with air or polymer or oil. The majority of the heat transfer element 100 is a good electrical conductor with an isotropic electrical conductivity. The material of Element 110 may be an aluminum alloy.

Eddy Currents

Reference is made above to Eddy current generation, with the following providing some relevant details.

The formula for eddy losses is a function of;

$$P=fn(\rho,B^2,d^2,f^2)$$

Where, ρ is the resistivity of the material, B is magnetic field strength, d is thickness of material, and f is frequency.

With respect to the inductor coil and heat sink described above, f the frequency can be considered to be constant in all innovation applications. However, B the magnetic field, does change between 90 and 100. However, due to the requirement to have thermal transfer between 90 and 110 of the heat sink 100 a change in the thickness d or ρ is provided to achieve this. Regarding the resistivity ρi of the material. If the first part 90 and second part 110 of the heat sink 100 are made from extruded aluminum, the thickness d can be changed as the resistivity of the aluminum will remain constant if both parts are made from the same material. However, by reducing the d term between the parts, you are introducing a medium of higher electrical resistance in between to break down the eddy fields.

This holds true for laminate or slotted aluminum as you are adding air (potentially filled with thermal epoxy) or Baclac for gluing laminate which both have higher electrical resistance.

Adding a thermal SIL-pad add a layer of high electrical resistance thermal transfer layer to the aluminum. To add enough distance to reduce the B field sufficiently the thickness of the SIL-Pad would need to be large and fairly poor for thermal transfer but could be an embodiment of use.

Thus, an inductor coil and heatsink have been developed where a heatsink of thermally conductive material is connected to a coil of a plurality of turns of electrically conductive material of the inductor. The heatsink is connected to the coil via a thermally conductive path that reduces eddy field generation through a difference in structure and/or material within the field generating area.

A reduction in volume can for example be achieved via a thermal conductive pad, where the thickness of the pad creates a thermal path to the heatsink but introduces a reduced volume.

A reduction in volume of material can be achieved alternatively or additionally through removal of material in slots or grooves that reduces circulating eddy currents.

Furthermore, the heatsink can have screw terminals for mechanical fixing, and pins for mechanical alignment and mechanical fixing to a medium such as a printed circuit board. The screw terminals can screw into an a heatsink with fin features, in which heat transfer to ambient is improved.

Additionally, it is to be noted that inductor coils can be provided with a gap in the core, either centrally between to ferrite components or next to one of the ferrite components. The gap can be important in inductor design, because it can be used with respect to the control of magnetic resistance in magnetic circuit. However, now eddy currents in the windings of the coil are prevented because the wire is kept away from this central gap, via a nonconductive spacer placed in the gap that is wider than the core. The nonconductive spacer helps to keep the conductor out of the eddy current space, and reduces heat generation.

The following relates to examples, that provide specific details on a number of possible arrangements of the inductor coils, and specific details on a number of possible ways of cooling the inductor coils Example 1. An inductor coil, comprising:

a first component 12;

a second component 14;

a length of conductor 18;

a heat sink 100;

wherein, the first component is located adjacent to the second component;

wherein, a core 16 is formed from the first component and the second component;

wherein, a first part of the length of conductor is wound around at least the core to form a plurality of turns of conductor;

wherein, the heat sink comprises a thermally conductive material;

wherein, the heat sink comprises a first part 90, 110 and a second part;

wherein, the first part of the heat sink has a first material and/or structural characteristic and the second part of the heat sink has a second material and/or structural characteristic different to the first material and/or structural characteristic; and wherein, an inner surface of the first part of the heat sink is in contact with an outer surface of a part of the plurality of turns of conductor.

Example 2. Inductor coil according to Example 1, wherein the first material and/or structural characteristic comprises a magnetic permeability and the second material and/or structural characteristic comprises a magnetic permeability greater than the magnetic permeability of the first part of the heat sink.

Example 3. Inductor coil according to any pf Examples 1-2, wherein the first material and/or structural characteristic comprises a resistance or resistivity and the second material and/or structural characteristic comprises a resistance or resistivity less than the resistance or resistivity of the first part of the heat sink.

Example 4. Inductor coil according to Example 3, wherein a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

Example 5. Inductor coil according to any of Examples 1-4, wherein the first material and/or structural characteristic comprises a conductivity or conductance and the second material and/or structural characteristic comprises a conductivity or conductance less than the resistance or resistivity of the first part of the heat sink.

Example 6. Inductor coil according to Example 5, wherein a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

Example 7. Inductor coil according to any of Examples 1-6, wherein the heat sink 100 is formed from a single piece, wherein the first structural characteristic of the first part 90 is different to the second structural characteristic of the second part 110.

Example 8. Inductor coil according to any of Examples 1-7, wherein the first part 110 of the heat sink has a thickness in an axial direction of the core that is less than a thickness of the second part of the heat sink in the axial direction of the core.

Example 9. Inductor coil according to any of Examples 1-8, wherein, the first part 90 of the heat sink comprises a plurality of slots or grooves.

Example 10. Inductor coil according to Example 9, wherein the plurality of slots or grooves extend to the inner surface of the first part of the heat sink.

Example 11. Inductor coil according to any of Examples 9-10, wherein the plurality of slots or grooves extend to a boundary between the first part of the heat sink and the second part of the heat sink.

Example 12. Inductor coil according to any of Examples 9-11, wherein the plurality of slots or grooves each have a longitudinal axis that intersects with a central axis of the core.

Example 13. Inductor coil according to any of Examples 1-12, wherein the second part of the heat sink is configured to connect to a printed circuit board 120.

Example 14. Inductor coil according to any of Examples 1-13, wherein the heat sink comprises at least one third part 130, 140 located on at opposite side of the second part of the heat sink to the first part of the heat sink, and wherein the at least one third part of the heat sink is configured to transfer heat away from the second part of the heat sink.

Example 15. Inductor coil according to Example 14, wherein a third part of the at least one third part the heat sink comprises a finned structured 130.

Example 16. Inductor coil according to any of Examples 14-15, wherein a third part of the at least one third part the heat sink comprises a connection terminal 140.

Example 17. Inductor coil according to Example 16, wherein the connection terminal comprises the finned structure.

Example 18. Inductor coil according to Example 16, wherein the connection terminal comprises a thick copper wire.

Example 19. Inductor coil according to any of Examples 1-18, wherein the second part of the heat sink comprises one or more pins configured for mechanical alignment with a printed circuit board 120 and/or for mechanical fixation to the printed circuit board.

Example 20. Inductor coil according to any of Examples 1-19, wherein the first part and second part of the heat sink extend substantially in a direction perpendicular to a central axis of the core.

Example 21. Inductor coil according to any of Examples 1-20, wherein a core portion of the first component is spaced from a core portion of the second component to form a gap (20) in the core; wherein the first part of the length of conductor is wound around the core and the gap in the core; wherein an inner part of the conductor of two or more turns of the conductor located around the core are spaced from a central axis of the core by at least one first distance; and wherein an inner part of the conductor of one or more turns of the conductor located around the gap in the core is spaced from the central axis by at least one second distance greater than the at least one first distance.

Example 22. Inductor coil according to any of Examples 1-21, wherein a core portion of the first component is spaced from a core portion of the second component to form a gap 20 in the core; wherein a spacer 30 is located in the gap in the core to form a gap 22 around the core, wherein an outer surface of a portion of the spacer is located a distance from a central axis of the core that is greater than a distance from the central axis to an outer surface of the first component and an outer surface of the second component that form the core.

Example 23. Inductor coil according to Example 22, wherein a dimension of the portion of the spacer adjacent to the outer surface of the first component and the outer surface of the second component in the direction of the central axis is greater than a dimension of the gap 24 in the core in the direction of the central axis.

Example 24. Inductor coil according to any of Examples 22-23 when dependent upon Example 21, wherein the outer surface of the portion of the spacer is configured to contact the one or more turns of conductor located around the gap in the core.

Example 25. Inductor coil according to any of Examples 22-24, wherein the spacer comprises a non-conductive material.

Example 26. Inductor coil according to any of Examples 22-25, wherein the spacer comprises a central hole 32 configured to be located around the central axis.

Example 27. An inductor coil, comprising:

a first component 12;

a second component 14;

a length of conductor 18;

a heat sink 100;

wherein, the first component is located adjacent to the second component;

wherein, a core 16 is formed from the second component;

wherein, a first part of the length of conductor is wound around at least the core to form a plurality of turns of conductor;

wherein, the heat sink comprises a thermally conductive material;

wherein, the heat sink comprises a first part 90, 110 and a second part;

wherein, the first part of the heat sink has a first material and/or structural characteristic and the second part of the heat sink has a second material and/or structural characteristic different to the first material and/or structural characteristic; and wherein, an inner surface of the first part of the heat sink is in contact with an outer surface of a part of the plurality of turns of conductor.

Example 28. Inductor coil according to Example 27, wherein the first material and/or structural characteristic comprises a magnetic permeability and the second material and/or structural characteristic comprises a magnetic permeability greater than the magnetic permeability of the first part of the heat sink.

Example 29. Inductor coil according to any pf Examples 27-28, wherein the first material and/or structural characteristic comprises a resistance or resistivity and the second material and/or structural characteristic comprises a resistance or resistivity less than the resistance or resistivity of the first part of the heat sink.

Example 30. Inductor coil according to Example 29, wherein a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

Example 31. Inductor coil according to any of Examples 27-30, wherein the first material and/or structural characteristic comprises a conductivity or conductance and the second material and/or structural characteristic comprises a conductivity or conductance less than the resistance or resistivity of the first part of the heat sink.

Example 32. Inductor coil according to Example 31, wherein a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

Example 33. Inductor coil according to any of Examples 27-32, wherein the heat sink 100 is formed from a single piece, wherein the first structural characteristic of the first part 90 is different to the second structural characteristic of the second part 110.

Example 34. Inductor coil according to any of Examples 27-33, wherein the first part 110 of the heat sink has a thickness in an axial direction of the core that is less than a thickness of the second part of the heat sink in the axial direction of the core.

Example 35. Inductor coil according to any of Examples 27-34, wherein, the first part 90 of the heat sink comprises a plurality of slots or grooves.

Example 36. Inductor coil according to Example 35, wherein the plurality of slots or grooves extend to the inner surface of the first part of the heat sink.

Example 37. Inductor coil according to any of Examples 35-36, wherein the plurality of slots or grooves extend to a boundary between the first part of the heat sink and the second part of the heat sink.

Example 38. Inductor coil according to any of Examples 35-37, wherein the plurality of slots or grooves each have a longitudinal axis that intersects with a central axis of the core.

Example 39. Inductor coil according to any of Examples 27-38, wherein the second part of the heat sink is configured to connect to a printed circuit board 120.

Example 40. Inductor coil according to any of Examples 27-39, wherein the heat sink comprises at least one third part 130, 140 located on at opposite side of the second part of the heat sink to the first part of the heat sink, and wherein the at least one third part of the heat sink is configured to transfer heat away from the second part of the heat sink.

Example 41. Inductor coil according to Example 40, wherein a third part of the at least one third part the heat sink comprises a finned structured 130.

Example 42. Inductor coil according to any of Examples 40-41, wherein a third part of the at least one third part the heat sink comprises a connection terminal 140.

Example 43. Inductor coil according to Example 42, wherein the connection terminal comprises the finned structure.

Example 44. Inductor coil according to Example 42, wherein the connection terminal comprises a thick copper wire.

Example 45. Inductor coil according to any of Examples 27-44, wherein the second part of the heat sink comprises one or more pins configured for mechanical alignment with a printed circuit board 120 and/or for mechanical fixation to the printed circuit board.

Example 46. Inductor coil according to any of Examples 27-45, wherein the first part and second part of the heat sink extend substantially in a direction perpendicular to a central axis of the core.

Example 47. Inductor coil according to any of Examples 27-46, wherein the core of the second component is spaced from the first component to form a gap 20 between the core and the first component; wherein the first part of the length of conductor is wound around the core and the gap between the core and the first component; wherein an inner part of the conductor of two or more turns of the conductor located around the core are spaced from a central axis of the core by at least one first distance; and wherein an inner part of the conductor of one or more turns of the conductor located around the gap between the core and the first component is spaced from the central axis by at least one second distance greater than the at least one first distance.

Example 48. Inductor coil according to any of Examples 27-47, wherein the core of the second component is spaced from the first component to form a gap 20 between the core and the first component; wherein a spacer 30 is located in the gap between the core and the first component to form a gap 22 around the core, wherein an outer surface of a portion of the spacer is located a distance from a central axis of the core that is greater than a distance from the central axis to an outer surface of the core of the second component.

Example 49. Inductor coil according to Example 48, wherein a dimension of the portion of the spacer adjacent to the outer surface of the core of the second component in the direction of the central axis is greater than a dimension of the gap 24 between the core and the first component in the direction of the central axis.

Example 50. Inductor coil according to any of Examples 48-49 when dependent upon Example 47, wherein the outer surface of the portion of the spacer is configured to contact the one or more turns of conductor located around the gap between the core and the first component.

Example 51. Inductor coil according to any of Examples 48-50, wherein the spacer comprises a non-conductive material.

Example 52. Inductor coil according to any of Examples 48-51, wherein the spacer comprises a central hole 32 configured to be located around the central axis.

Example 53. A method of cooling an inductor coil, wherein the inductor coil comprises a first component 12, a second component 14, a length of conductor 18; wherein the first component is located adjacent to the second component, wherein a core 16 is formed from the first component and the second component, wherein a first part of the length of conductor is wound around at least the core to form a plurality of turns of conductor; and wherein the method comprises:

utilizing a heat sink 100, wherein the heat sink comprises a thermally conductive material, wherein the heat sink comprises a first part 90, 110 and a second part, wherein the first part of the heat sink has a first material and/or structural characteristic and the second part of the heat sink has a second material and/or structural characteristic different to the first material and/or structural characteristic; and wherein, utilizing the heat sink comprises contacting an inner surface of the first part of the heat sink with an outer surface of a part of the plurality of turns of conductor.

Example 54. Method according to Example 53, wherein the first material and/or structural characteristic comprises a magnetic permeability and the second material and/or structural characteristic comprises a magnetic permeability greater than the magnetic permeability of the first part of the heat sink.

Example 55. Method according to any of Examples 53-54, wherein the first material and/or structural characteristic comprises a resistance or resistivity and the second material and/or structural characteristic comprises a resistance or resistivity less than the resistance or resistivity of the first part of the heat sink.

Example 56. Method according to Example 55, wherein a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

Example 57. Method according to any of Examples 53-56, wherein the first material and/or structural characteristic comprises a conductivity or conductance and the second material and/or structural characteristic comprises a conductivity or conductance less than the resistance or resistivity of the first part of the heat sink.

Example 58. Method according to Example 57, wherein a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

Example 59. Method according to any of Examples 53-58, wherein the heat sink 100 is formed from a single piece, wherein the first structural characteristic of the first part 90 is different to the second structural characteristic of the second part 110.

Example 60. Method according to any of Examples 53-59, wherein the first part 110 of the heat sink has a thickness in an axial direction of the core that is less than a thickness of the second part of the heat sink in the axial direction of the core.

Example 61. Method according to any of Examples 53-60, wherein, the first part 90 of the heat sink comprises a plurality of slots or grooves.

Example 62. Method according to Example 61, wherein the plurality of slots or grooves extend to the inner surface of the first part of the heat sink.

Example 63. Method according to any of Examples 61-62, wherein the plurality of slots or grooves extend to a boundary between the first part of the heat sink and the second part of the heat sink.

Example 64. Method according to any of Examples 61-63, wherein the plurality of slots or grooves each have a longitudinal axis that intersects with a central axis of the core.

Example 65. Method according to any of Examples 53-64, wherein the method comprises connecting the second part of the heat sink to a printed circuit board 120.

Example 66. Method to any of Examples 53-65, wherein the heat sink comprises at least one third part 130, 140 located on at opposite side of the second part of the heat sink to the first part of the heat sink, and wherein the method comprises transferring heat away from the second part of the heat sink via the at least one third part of the heat sink.

Example 67. Method according to Example 66, wherein a third part of the at least one third part the heat sink comprises a finned structured 130.

Example 68. Method according to any of Examples 66-67, wherein a third part of the at least one third part the heat sink comprises a connection terminal 140.

Example 69. Method according to Example 68, wherein the connection terminal comprises the finned structure.

Example 70. Method according to Example 68, wherein the connection terminal comprises a thick copper wire.

Example 71. Method according to any of Examples 53-70, wherein the second part of the heat sink comprises one or more pins and wherein the method comprises mechanically aligning the one or more pins with a printed circuit board 120 and/or mechanically fixing the one or more pins to the printed circuit board.

Example 72. Method according to any of Examples 53-71, wherein the first part and second part of the heat sink extend substantially in a direction perpendicular to a central axis of the core.

Example 73. Method according to any of Examples 53-72, wherein a core portion of the first component is spaced from a core portion of the second component to form a gap 20 in the core; wherein the first part of the length of conductor is wound around the core and the gap in the core; wherein an inner part of the conductor of two or more turns of the conductor located around the core are spaced from a central axis of the core by at least one first distance; and wherein the method comprises spacing an inner part of the conductor of one or more turns of the conductor located around the gap in the core from the central axis by at least one second distance greater than the at least one first distance.

Example 74. Method according to any of Examples 53-73, wherein a core portion of the first component is spaced from a core portion of the second component to form a gap 20 in the core; wherein the method comprises locating a spacer 30 in the gap in the core to form a gap 22 around the core, wherein an outer surface of a portion of the spacer is located a distance from a central axis of the core that is greater than a distance from the central axis to an outer surface of the first component and an outer surface of the second component that form the core.

Example 75. Method according to Example 74, wherein a dimension of the portion of the spacer adjacent to the outer surface of the first component and the outer surface of the second component in the direction of the central axis is greater than a dimension of the gap 24 in the core in the direction of the central axis.

Example 76. Method according to any of Examples 74-75 when dependent upon Example 73, wherein the method comprises contacting the outer surface of the portion of the spacer with the one or more turns of conductor located around the gap in the core.

Example 77. Inductor coil according to any of Examples 74-76, wherein the spacer comprises a non-conductive material.

Example 78. Method coil according to any of Examples 74-77, wherein the spacer comprises a central hole 32 configured to be located around the central axis.

Example 79. A method of cooling an inductor coil, wherein the inductor coil comprises a first component 12, a second component 14, a length of conductor 18, wherein the first component is located adjacent to the second component, wherein a core 16 is formed from the second component, wherein a first part of the length of conductor is wound around at least the core to form a plurality of turns of conductor; and wherein the method comprises:

utilizing a heat sink 100, wherein the heat sink comprises a thermally conductive material, wherein the heat sink comprises a first part 90, 110 and a second part, wherein the first part of the heat sink has a first material and/or structural characteristic and the second part of the heat sink has a second material and/or structural characteristic different to the first material and/or structural characteristic; and wherein utilizing the heat sink comprises contacting an inner surface of the first part of the heat sink with an outer surface of a part of the plurality of turns of conductor.

Example 80. Method according to Example 79, wherein the first material and/or structural characteristic comprises a magnetic permeability and the second material and/or structural characteristic comprises a magnetic permeability greater than the magnetic permeability of the first part of the heat sink.

Example 81. Method according to any of Examples 79-80, wherein the first material and/or structural characteristic comprises a resistance or resistivity and the second material and/or structural characteristic comprises a resistance or resistivity less than the resistance or resistivity of the first part of the heat sink.

Example 82. Method according to Example 81, wherein a circumferential resistance of the first part of the heat sink is greater than a radial resistance of the first part of the heat sink, and the circumferential resistance of the first part of the heat sink is greater than a radial resistance of the second part of the heat sink and is greater than a circumferential resistance of the second part of the heat sink.

Example 83. Method according to any of Examples 79-82, wherein the first material and/or structural characteristic comprises a conductivity or conductance and the second material and/or structural characteristic comprises a conductivity or conductance less than the resistance or resistivity of the first part of the heat sink.

Example 84. Method according to Example 83, wherein a circumferential conductance of the first part of the heat sink is less than a radial conductance of the first part of the heat sink, and the circumferential conductance of the first part of the heat sink is less than a radial conductance of the second part of the heat sink and is less than a circumferential conductance of the second part of the heat sink.

Example 85. Method according to any of Examples 79-84, wherein the heat sink 100 is formed from a single piece, wherein the first structural characteristic of the first part 90 is different to the second structural characteristic of the second part 110.

Example 86. Method according to any of Examples 79-85, wherein the first part 110 of the heat sink has a thickness in an axial direction of the core that is less than a thickness of the second part of the heat sink in the axial direction of the core.

Example 87. Method according to any of Examples 79-86, wherein, the first part 90 of the heat sink comprises a plurality of slots or grooves.

Example 88. Method according to Example 87, wherein the plurality of slots or grooves extend to the inner surface of the first part of the heat sink.

Example 89. Method according to any of Examples 87-88, wherein the plurality of slots or grooves extend to a boundary between the first part of the heat sink and the second part of the heat sink.

Example 90. Method according to any of Examples 87-89, wherein the plurality of slots or grooves each have a longitudinal axis that intersects with a central axis of the core.

Example 91. Method according to any of Examples 79-90, wherein the method comprises connecting the second part of the heat sink to a printed circuit board 120.

Example 92. Method according to any of Examples 79-91, wherein the heat sink comprises at least one third part 130, 140 located on at opposite side of the second part of the heat sink to the first part of the heat sink, and wherein the method comprises transferring heat away from the second part of the heat sink via the at least one third part of the heat sink.

Example 93. Method according to Example 92, wherein a third part of the at least one third part the heat sink comprises a finned structured 130.

Example 94. Method according to any of Examples 92-93, wherein a third part of the at least one third part the heat sink comprises a connection terminal 140.

Example 95. Method according to Example 94, wherein the connection terminal comprises the finned structure.

Example 96. Method according to Example 94, wherein the connection terminal comprises a thick copper wire.

Example 97. Method according to any of Examples 79-96, wherein the second part of the heat sink comprises one or more pins and wherein the method comprises mechanically aligning the one or more pins with a printed circuit board 120 and/or mechanically fixing the one or more pins to the printed circuit board.

Example 98. Method to any of Examples 79-97, wherein the first part and second part of the heat sink extend substantially in a direction perpendicular to a central axis of the core.

Example 99. Method according to any of Examples 79-98, wherein the core of the second component is spaced from the first component to form a gap 20 between the core and the first component; wherein the first part of the length of conductor is wound around the core and the gap between the core and the first component; wherein an inner part of the conductor of two or more turns of the conductor located around the core are spaced from a central axis of the core by at least one first distance; and wherein the method comprises spacing an inner part of the conductor of one or more turns of the conductor located around the gap between the core and the first component from the central axis by at least one second distance greater than the at least one first distance.

Example 100. Method according to any of Examples 79-99, wherein the core of the second component is spaced from the first component to form a gap 20 between the core and the first component; wherein the method comprises locating a spacer 30 in the gap between the core and the first component to form a gap 22 around the core, wherein an outer surface of a portion of the spacer is located a distance from a central axis of the core that is greater than a distance from the central axis to an outer surface of the core of the second component.

Example 101. Method according to Example 100, wherein a dimension of the portion of the spacer adjacent to the outer surface of the core of the second component in the direction of the central axis is greater than a dimension of the gap 24 between the core and the first component in the direction of the central axis.

Example 102. Method according to any of Examples 100-101 when dependent upon Example 99, wherein the method comprises contacting the outer surface of the portion of the spacer with the one or more turns of conductor located around the gap between the core and the first component.

Example 103. Method according to any of Examples 100-102, wherein the spacer comprises a non-conductive material.

Example 104. Method according to any of Examples 100-103, wherein the spacer comprises a central hole 32 configured to be located around the central axis.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. An inductor coil, comprising:

a first component;

a second component;

a length of conductor;

a heat sink;

wherein, the first component is located adjacent to the second component;

wherein, a core is formed from the first component and the second component;

wherein, a first part of the length of conductor is wound around at least the core to form a plurality of turns of conductor;

wherein, the heat sink comprises a thermally conductive material;

wherein, the heat sink comprises a first part and a second part;

wherein, the first part of the heat sink has a first material and/or structural characteristic and the second part of the heat sink has a second material or structural characteristic different to the first material or structural characteristic;

wherein, an inner surface of the first part of the heat sink is in contact with an outer surface of a part of the plurality of turns of conductor;

wherein the first material or structural characteristic comprises a resistance or resistivity and the second material or structural characteristic comprises a resistance or resistivity less than the resistance or resistivity of the first part of the heat sink; and wherein a circumferential resistance of the first part of the heat sink is greater than a radial resistance of the first part of the heat sink, and wherein the circumferential resistance of the first part of the heat sink is greater than a radial resistance of the second part of the heat sink and is greater than a circumferential resistance of the second part of the heat sink.

2. The inductor coil according to claim 1, wherein the first material or structural characteristic comprises a magnetic permeability and the second material or structural characteristic comprises a magnetic permeability greater than the magnetic permeability of the first part of the heat sink.

3. An inductor coil, comprising:

a first component;

a second component;

a length of conductor;

a heat sink;

wherein, the first component is located adjacent to the second component;

wherein, a core is formed from the first component and the second component;

wherein, a first part of the length of conductor is wound around at least the core to form a plurality of turns of conductor;

wherein, the heat sink comprises a thermally conductive material;

wherein, the heat sink comprises a first part and a second part;

wherein, the first part of the heat sink has a first material and/or structural characteristic and the second part of the heat sink has a second material or structural characteristic different to the first material or structural characteristic;

wherein, an inner surface of the first part of the heat sink is in contact with an outer surface of a part of the plurality of turns of conductor; and wherein the first material or structural characteristic comprises a conductivity or conductance and the second material or structural characteristic comprises a conductivity or conductance less than the resistance or resistivity of the first part of the heat sink.

4. The inductor coil according to claim 3, wherein a circumferential conductance of the first part of the heat sink is less than a radial conductance of the first part of the heat sink, and wherein the circumferential conductance of the first part of the heat sink is less than a radial conductance of the second part of the heat sink and is less than a circumferential conductance of the second part of the heat sink.

5. An inductor coil, comprising:

a first component;

a second component;

a length of conductor;

a heat sink;

wherein, the first component is located adjacent to the second component;

wherein, a core is formed from the first component and the second component;

wherein, a first part of the length of conductor is wound around at least the core to form a plurality of turns of conductor;

wherein, the heat sink comprises a thermally conductive material;

wherein, the heat sink comprises a first part and a second part;

wherein, the first part of the heat sink has a first material and/or structural characteristic and the second part of the heat sink has a second material or structural characteristic different to the first material or structural characteristic;

wherein, an inner surface of the first part of the heat sink is in contact with an outer surface of a part of the plurality of turns of conductor; and wherein the heat sink is formed from a single piece, wherein the first structural characteristic of the first part is different to the second structural characteristic of the second part.

6. The inductor coil according to claim 1, wherein the first part of the heat sink has a thickness in an axial direction of the core that is less than a thickness of the second part of the heat sink in the axial direction of the core.

7. The inductor coil according to claim 1, wherein, the first part of the heat sink comprises a plurality of slots or grooves.

8. The inductor coil according to claim 7, wherein the plurality of slots or grooves extend to the inner surface of the first part of the heat sink.

9. The inductor coil according to claim 7, wherein the plurality of slots or grooves extend to a boundary between the first part of the heat sink and the second part of the heat sink.

10. The inductor coil according to claim 7, wherein the plurality of slots or grooves each have a longitudinal axis that intersects with a central axis of the core.

11. The inductor coil according to claim 1, wherein the second part of the heat sink is configured to connect to a printed circuit board.

12. The inductor coil according to claim 1, wherein the heat sink comprises at least one third part located on at opposite side of the second part of the heat sink to the first part of the heat sink, and wherein the at least one third part of the heat sink is configured to transfer heat away from the second part of the heat sink.

13. The inductor coil according to claim 12, wherein a third part of the at least one third part the heat sink comprises a finned structured.

14. An inductor coil, comprising:

a first component;

a second component;

a length of conductor;

a heat sink;

wherein, the first component is located adjacent to the second component;

wherein, a core is formed from the first component and the second component;

wherein, a first part of the length of conductor is wound around at least the core to form a plurality of turns of conductor;

wherein, the heat sink comprises a thermally conductive material;

wherein, the heat sink comprises a first part and a second part;

wherein, the first part of the heat sink has a first material and/or structural characteristic and the second part of the heat sink has a second material or structural characteristic different to the first material or structural characteristic;

wherein, an inner surface of the first part of the heat sink is in contact with an outer surface of a part of the plurality of turns of conductor;

wherein the heat sink comprises at least one third part located on at opposite side of the second part of the heat sink to the first part of the heat sink, and wherein the at least one third part of the heat sink is configured to transfer heat away from the second part of the heat sink; and wherein a third part of the at least one third part the heat sink comprises a connection terminal.

15. The inductor coil according to claim 14, wherein the connection terminal comprises the finned structure.

16. The inductor coil according to claim 14, wherein the connection terminal comprises a thick copper wire.

17. The inductor coil according to claim 1, wherein the second part of the heat sink comprises one or more pins configured for mechanical alignment with a printed circuit board or for mechanical fixation to the printed circuit board.

18. The inductor coil according to claim 1, wherein the first part and second part of the heat sink extend substantially in a direction perpendicular to a central axis of the core.

19. An inductor coil, comprising:

a first component;

a second component;

a length of conductor;

a heat sink;

wherein, the first component is located adjacent to the second component;

wherein, a core is formed from the first component and the second component;

wherein, a first part of the length of conductor is wound around at least the core to form a plurality of turns of conductor;

wherein, the heat sink comprises a thermally conductive material;

wherein, the heat sink comprises a first part and a second part;

wherein, the first part of the heat sink has a first material and/or structural characteristic and the second part of the heat sink has a second material or structural characteristic different to the first material or structural characteristic;

wherein, an inner surface of the first part of the heat sink is in contact with an outer surface of a part of the plurality of turns of conductor; and wherein a core portion of the first component is spaced from a core portion of the second component to form a gap in the core; wherein the first part of the length of conductor is wound around the core and the gap in the core; wherein an inner part of the conductor of two or more turns of the conductor located around the core are spaced from a central axis of the core by at least one first distance; and wherein an inner part of the conductor of one or more turns of the conductor located around the gap in the core is spaced from the central axis by at least one second distance greater than the at least one first distance.

20. An inductor coil, comprising:

a first component;

a second component;

a length of conductor;

a heat sink;

wherein, the first component is located adjacent to the second component;

wherein, a core is formed from the first component and the second component;

wherein, a first part of the length of conductor is wound around at least the core to form a plurality of turns of conductor;

wherein, the heat sink comprises a thermally conductive material;

wherein, the heat sink comprises a first part and a second part;

wherein, the first part of the heat sink has a first material and/or structural characteristic and the second part of the heat sink has a second material or structural characteristic different to the first material or structural characteristic;

wherein, an inner surface of the first part of the heat sink is in contact with an outer surface of a part of the plurality of turns of conductor; and wherein a core portion of the first component is spaced from a core portion of the second component to form a gap in the core; wherein a spacer is located in the gap in the core to form a gap around the core, wherein an outer surface of a portion of the spacer is located a distance from a central axis of the core that is greater than a distance from the central axis to an outer surface of the first component and an outer surface of the second component that form the core.

21. An inductor coil, comprising:

a first component;

a second component;

a length of conductor;

a heat sink;

wherein, the first component is located adjacent to the second component;

wherein, a core is formed from the second component;

wherein, a first part of the length of conductor is wound around at least the core to form a plurality of turns of conductor;

wherein, the heat sink comprises a thermally conductive material;

wherein, the heat sink comprises a first part and a second part;

wherein, the first part of the heat sink has a first material or structural characteristic and the second part of the heat sink has a second material or structural characteristic different to the first material or structural characteristic;

wherein, an inner surface of the first part of the heat sink is in contact with an outer surface of a part of the plurality of turns of conductor;

wherein the first material or structural characteristic comprises a resistance or resistivity and the second material or structural characteristic comprises a resistance or resistivity less than the resistance or resistivity of the first part of the heat sink; and wherein a circumferential resistance of the first part of the heat sink is greater than a radial resistance of the first part of the heat sink, and wherein the circumferential resistance of the first part of the heat sink is greater than a radial resistance of the second part of the heat sink and is greater than a circumferential resistance of the second part of the heat sink.

22. A method of cooling an inductor coil, wherein the inductor coil comprises a first component, a second component, a length of conductor, wherein the first component is located adjacent to the second component, wherein a core is formed from the first component and the second component, wherein a first part of the length of conductor is wound around at least the core to form a plurality of turns of conductor, and wherein the method comprises:

utilizing a heat sink, wherein the heat sink comprises a thermally conductive material, wherein the heat sink comprises a first part and a second part, wherein, the first part of the heat sink has a first material or structural characteristic and the second part of the heat sink has a second material or structural characteristic different to the first material and/or structural characteristic; and wherein, utilizing the heat sink comprises contacting an inner surface of the first part of the heat sink with an outer surface of a part of the plurality of turns of conductor;

wherein the first material or structural characteristic comprises a resistance or resistivity and the second material or structural characteristic comprises a resistance or resistivity less than the resistance or resistivity of the first part of the heat sink; and wherein a circumferential resistance of the first part of the heat sink is greater than a radial resistance of the first part of the heat sink, and wherein the circumferential resistance of the first part of the heat sink is greater than a radial resistance of the second part of the heat sink and is greater than a circumferential resistance of the second part of the heat sink.

23. A method of cooling an inductor coil, wherein the inductor coil comprises a first component, a second component, a length of conductor, wherein the first component is located adjacent to the second component, wherein a core is formed from the second component, wherein a first part of the length of conductor is wound around at least the core to form a plurality of turns of conductor, and wherein the method comprises:

utilizing a heat sink, wherein the heat sink comprises a thermally conductive material, wherein the heat sink comprises a first part and a second part, wherein, the first part of the heat sink has a first material or structural characteristic and the second part of the heat sink has a second material or structural characteristic different to the first material and/or structural characteristic; and wherein utilizing the heat sink comprises contacting an inner surface of the first part of the heat sink with an outer surface of a part of the plurality of turns of conductor;

wherein the first material or structural characteristic comprises a resistance or resistivity and the second material or structural characteristic comprises a resistance or resistivity less than the resistance or resistivity of the first part of the heat sink; and wherein a circumferential resistance of the first part of the heat sink is greater than a radial resistance of the first part of the heat sink, and wherein the circumferential resistance of the first part of the heat sink is greater than a radial resistance of the second part of the heat sink and is greater than a circumferential resistance of the second part of the heat sink.

* * * * *